United States Patent [19]
Kitamura et al.

[11] Patent Number: 5,757,287
[45] Date of Patent: May 26, 1998

[54] OBJECT RECOGNITION SYSTEM AND ABNORMALITY DETECTION SYSTEM USING IMAGE PROCESSING

[75] Inventors: Tadaaki Kitamura, Ibaraki-ken; Yoshiki Kobayashi, Hitachi; Kunio Nakanishi, Hitachi; Masakazu Yahiro, Hitachi; Yoshiyuki Satoh, Hitachi; Toshiro Shibata, Urawa; Takeshi Horie, Kashiwa; Katsuyuki Yamamoto, Matsudo; Masao Takatoo; Haruki Inoue, both of Katsuta; Kazuyoshi Asada, Hitachi, all of Japan

[73] Assignee: Hitachi, Ltd., Tokyo, Japan

[21] Appl. No.: 584,667

[22] Filed: Jan. 11, 1996

Related U.S. Application Data

[63] Continuation of Ser. No. 51,692, Apr. 23, 1993, Pat. No. 5,554,983.

[30] Foreign Application Priority Data

| Apr. 24, 1992 | [JP] | Japan | 4-106415 |
| Jul. 13, 1992 | [JP] | Japan | 4-185235 |
| Aug. 27, 1992 | [JP] | Japan | 4-228751 |

[51] Int. Cl.$^6$ .................................. G08G 1/017
[52] U.S. Cl. .................. 340/937; 340/934; 340/935; 340/936; 382/104; 701/117; 701/118
[58] Field of Search ............... 340/917, 919, 340/920, 922, 928, 934, 935, 937, 936; 364/436, 437; 358/105, 113; 382/103, 104, 107, 190, 209

[56] References Cited

U.S. PATENT DOCUMENTS 5,283,573 2/1994 Takatou et al. ................. 340/934

FOREIGN PATENT DOCUMENTS

| 474307 | 2/1989 | European Pat. Off. . |
| 0454166 | 10/1991 | European Pat. Off. . |
| 0474307 | 3/1992 | European Pat. Off. . |
| 62-180488 | 8/1987 | Japan . |
| 63-98070 | 4/1988 | Japan . |
| 10445 | 2/1989 | Japan . |
| 1044584 | 2/1989 | Japan . |
| 2122400 | 5/1990 | Japan . |
| 3204783 | 9/1991 | Japan . |

OTHER PUBLICATIONS

Taniguchi et al., "Recognition of Moving Vehicles Using Directional–Temporal Plane Transform", Industrial Electronics and Systems Development Laboratory, pp. 1–8, May 1991.

Lee et al., "Morphologic Edge Detection", IEEE Journal of Robotics and Automation, vol. RA-3, No. 2, pp. 142–156, Apr. 1987.

(List continued on next page.)

*Primary Examiner*—Jeffery Hofsass
*Assistant Examiner*—Daryl C. Pope
*Attorney, Agent, or Firm*—Antonelli, Terry, Stout, & Kraus, LLP

[57] ABSTRACT

An object recognition system using the image processing in which an area having a unique feature is extracted from an input image of an object, the unique image is registered in a shade template memory circuit as a shade template, the input image is searched for an image similar to the shade template registered by a shade pattern matching circuit, the position of an object is determined for each template, the speed and direction of movement of the object is determined from the positional information, and the results thereof are integrated by a separation/integration circuit, thereby recognizing the whole of the moving object.

15 Claims, 29 Drawing Sheets

OTHER PUBLICATIONS

Okuyama et al., Architecture of Traffic Flow Measuring System Using Image Processing For Lecture at the 37th National Convention of Information Processing Society of Japan, 6T-6, pp. 1487-1488, 1988.

Nisho et al., "Tracking of Vehicles at an Intersection by Integration of Multiple Image Sensors", M IRU, pp. 1-169-1-176, Jul. 1992.

Kitamura et al., "Traffic Congestion Measuring System Using Image Processing" at the meeting of 1991 of the Institute of Electrical Engineers of Japan, pp. 1186-1187, 1991.

Yamamoto et al., "Two-Dimensional Vehicle Tracking Using Video Image Processing", Vehicle Navigation & Information Systems, IEEE, pp. 93-111, 1992.

Takatoo et al., "Automated Inspection and High-Speed Vision Architectures III", SPIE, vol. 1197, pp. 172-180, 1989.

Pineau et al., "Detection Et Suivi D'Objets Par Analyse De Sequences D'Images", Treizieme Colloque Sur Le Traitement Du Signal Et Des Images, 16-20, pp. 1135-1128, Sep. 1991.

Kudo, "Traffic Flow Measurement System Using Image Processing", vol. 17, No. 1, pp. 62-72, Jan. 1986.

Omura et al., "Development of An Image-Processing Traffic Flow Measurement System for Intersections", Sumitomo Electrical Review, No. 27, pp. 104-110, Jan. 1988.

Taniguchi et al., "Vehicle Recognition Using DTT Method", Computer Vision, Information Processing Society fo Japan, pp. 1-8, May 1991.

INPUT IMAGE f(t)

CENTRAL COORDINATE

INPUT IMAGE f(t+dt)

MAX SIMILARITY POINT

INPUT IMAGE f(t)

CENTRAL COORDINATE

INPUT IMAGE f(t+dt)

MAX SIMILARITY POINT AT T2

MAX SIMILARITY POINT AT T1

DIRECTION OF MOVEMENT t1   t2   t3   t4

TEMPLATES T1(t1) TO T3(t1)

t5   t6   t7   t8 t9   t10   t11   t12 t13   t14   t15   t16

$xs = x1 + Vmin \cdot \cos(\theta + \phi)$
$ys = y1 + Vmax \cdot \sin(\theta + \phi)$
$xe = x1 + Vmax \cdot \cos(\theta + \phi)$
$ye = y1 + Vmin \cdot \sin(\theta + \phi)$ TIME t TIME t + Δt INPUT IMAGE f(t)

T1  T2  T3  T4

INPUT IMAGE f(t+dt)

MAX SIMILARITY POINT OF T4
MAX SIMILARITY POINT OF T3
MAX SIMILARITY POINT OF T2
MAX SIMILARITY POINT OF T1

Y-AXIS

TRACES OF TEMPLATES T1 AND T2

TRACES OF TEMPLATES T3 AND T4

TIME

INPUT IMAGE

SEARCH STEPS

TIME t

TIME t+Δt

P1 (x0, y0)
P2 (x10, y10)

TIME t

P1' (x1, y1)
P2' (x11, y11)

TIME t1

P1" (x2, y2)
P2" (x12, y12)

TIME t2

$\Delta x = \alpha \cdot \sigma x$
$\Delta y = \alpha \cdot \sigma y$ ds : DISTANCE FROM LANE BOUNDARY TO LEFT COORDINATE OF VEHICLE de : DISTANCE FROM LANE BOUNDARY TO RIGHT COORDINATE OF VEHICLE

OBJECT RECOGNITION SYSTEM AND ABNORMALITY DETECTION SYSTEM USING IMAGE PROCESSING

This application is a 37 CFR §1.60 continuation of prior application Ser. No. 08/051,692, U.S. Pat. No. 5,554,983, filed Apr. 23, 1993.

CROSS-REFERENCE TO RELATED APPLICATIONS

This application relates to U.S. applications Ser. No. 07/692,718, now U.S. Pat. No. 5,283,573 filed on Apr. 29, 1991 entitled "TRAFFIC FLOW MEASURING METHOD AND APPARATUS" and Ser. No. 07/913,929, now abandoned, filed on Jul. 17, 1992 entitled "IMAGE RECOGNITION METHOD AND IMAGE RECOGNITION SYSTEM", assigned to the present assignee. The contents of these applications are incorporated herein by reference.

BACKGROUND OF THE INVENTION

1. Field of the Invention

The present invention relates to an object recognition system suitable for grasping motions of an object or more in particular to an object recognition system suitable for tracking a moving vehicle or the like, on the one hand, and to a system for detecting an abnormal phenomenon on a road or the like, or more in particular to a system for processing and detecting an image on a TV camera, on the other hand.

2. Description of the Related Art

To recognize the movement or the like motion of an object by use of image processing is considered to provide a very effective means in various applications. For example, vehicles running on the road are recognized to measure the information such as the number and speed of vehicles passed, whether they are stationary or not, etc.

Conventional systems for recognizing vehicles by processing an image on the TV camera are described in "Vehicle Recognition by DTT Method", Computer Vision, Information Processing Society of Japan, 72-5, May 1992.

To detect the traffic condition is very effective in maintaining a smooth road traffic. Systems including what is called a loop-type vehicle sensor and an ultrasonic vehicle sensor have been used for detecting the traffic condition. These systems exert ultrasonic wave or magnetism at a ground point on the road, measure the existence of a vehicle according to the change thereof, and detect the number and speed of vehicles on the basis of the time of change. These systems, however, are basically capable of determining the traffic condition only at a single ground point and therefore are disadvantageous in measuring a wide range of conditions. For this reason, a method has positively been used recently, in which an image obtained from the TV camera is processed to measure the traffic condition, as described in JP-A-2-122400. According to the conventional system disclosed in JP-A-3-204783, on the other hand, a moving object is traced by center-of-gravity calculation of a binary-coded input shade image from the TV camera. Another conventional system disclosed in JP-A-62-180488 concerns character recognition but not the recognition of a mobile object. According to the last-mentioned method, a multi-valued template is prepared and decomposed into a plurality of binary templates, so that similarity between the binary template and a binary-coded input image is determined by pattern matching thereby to achieve character recognition.

The prior art relating to pattern matching is disclosed in JP-A-63-98070, etc.

Further, early detection of an abnormal phenomenon on the road is important in maintaining a smooth road traffic. Specifically, it is necessary to detect an accident, a stationary vehicle, a fallen object or the like at an early time and prevent the secondary damage from being caused by such an abnormal phenomenon. Detection of an abnormal phenomenon in a tunnel is especially important. Systems applicable to such a purpose are expected to be developed more and more.

According to the conventional image processing systems, however, only what is called "the traffic flow data" including the number and speed of vehicles is measured, but the configuration thereof lacks means to detect various abnormal phenomena. An example of such a conventional traffic flow measuring system is disclosed in "Architecture of Traffic Flow Measuring System Using Image Processing" in a paper for Lecture at the 37th National Convention of Information Processing Society of Japan, 6T-6, 1988.

In the "Vehicle Recognition Using DTT Method" described above, an input image is differentiated and binary-coded, a binary projection distribution along X axis (horizontal direction) of this binary image is determined, and only the coordinates of this projection distribution beyond a predetermined threshold value are stored, thus determining the trace of vehicles. This process has been conventionally employed in most cases of measuring the number and speed of vehicles by image processing, thereby posing the problem that it is difficult to set a binary-coded threshold value on the one hand and measurement is difficult when vehicles are superposed one on another on the other.

According to the conventional techniques disclosed in JP-A-2-122400, JP-A-3-204783, JP-A-62-180488 and JP-A-63-98070, the number and speed of vehicles are measured by image processing in most cases through the processes of differentiation of input image, binary-coding and feature measurement. The problem of these methods is that a binary-coded threshold value cannot be easily set and measurement is difficult for vehicles superposed. Also, the conventional technique for binary-coding and center-of-gravity calculation of an input shade image encounters the problem that the image contrast is reduced by the change in the environment or situation in which the system is installed, thereby making it sometimes impossible to discriminate a vehicle from the background. The decomposition of a multi-valued template into a plurality of binary templates for pattern matching fails to recognize a moving object accurately.

As for abnormal phenomena in a tunnel, TV cameras are not actually installed at sufficiently short intervals to monitor the entire area in the tunnel. No one can predict where an abnormal phenomenon occurs. According to the conventional traffic flow measuring functions, therefore, it is virtually impossible for the conventional traffic flow measuring functions alone to measure abnormal phenomena occurring outside of the visual field of TV cameras. Another disadvantage of the conventional systems is that all abnormal phenomena cannot be grasped with the data on traffic flow.

SUMMARY OF THE INVENTION

According to a first aspect of the present invention, there is provided an object recognition system comprising a shade template memory circuit storing images at specified points of an object, a shade pattern matching circuit matching patterns between the shade template and an input image, and an integral processing section determining the position of an object by searching for an input image analogous to the one of the shade template, defining the speed and direction of vehicle movement by the coordinate change of the position of the object, and identifying that templates identical in behaviour represent the same object, wherein a unique area or feature area is picked up from an image of an object, the unique image is registered as a shade template, a point of movement is determined for each template by shade pattern matching, the speed and direction of vehicle movement are determined from information on the determined points of movement, and the result of the determination is integrated to recognize the whole of moving objects.

This technique will hereinafter be referred to as "Partial Correlation Integration Method (PCIM)".

According to this method, even for an object of low contrast such as in the case of a black vehicle located in a shadow environment, for example, portions of the object high in contrast can be registered as a shade template and integrated by post-processing. As a result, a moving object can be followed or tracked in satisfactory manner in spite of a change in brightness or superposition of objects which may occur.

According to a second aspect of the present invention, there is provided an object recognition system further comprising a template updating section whereby shade templates used by being extracted from an input shaded image are sequentially updated with the movement of an object to be detected, so that the shade templates are sequentially updated and therefore moving objects can be followed even when the shape or the like thereof undergoes a change over a long period of time.

According to a third aspect of the present invention, there is provided an abnormality detection system, in which "traffic flow measurement", "detection of stationary vehicles", "detection of abnormally-running vehicles" and "measurement of congestion degree" are executed within the visual field of TV cameras, and the result of these measurements is interpolated in space and time thereby to detect an abnormal phenomenon in other than the visual field.

Further, in order to determine various abnormal phenomena accurately, the various functions mentioned above are judged integrally or synthetically.

By way of explanation, the "traffic flow measurement" is for measuring the speed and number of vehicles in the visual field of TV cameras, the "detection of abnormally-running vehicles" for monitoring the running pattern of vehicles in the visual field of TV cameras, the "detection of stationary vehicles" for detecting a vehicle stationary or out of order or a fallen object within the visual field of TV cameras, and the "measurement of congestion degree" for stepwise measurement of the degree of vehicle congestion. An abnormality judgement is made by considering these factors as a whole. The above-mentioned functions are measured at each ground point, and the resulting data are spatially interpolated to predict an abnormality outside of the visual field of TV cameras.

Accurate detection of various abnormal phenomena is thus made possible, and any abnormal phenomenon outside of the visual field of TV cameras can also be detected.

DESCRIPTION OF THE PREFERRED EMBODIMENTS

An embodiment of the present invention will be described with reference to the accompanying drawings. By way of explanation, a road is photographed by TV camera with the description made about a technique of recognizing vehicles running on the road. This technique is applicable not only to measurement of behaviour of not only vehicles but all other objects.

Figure 1:
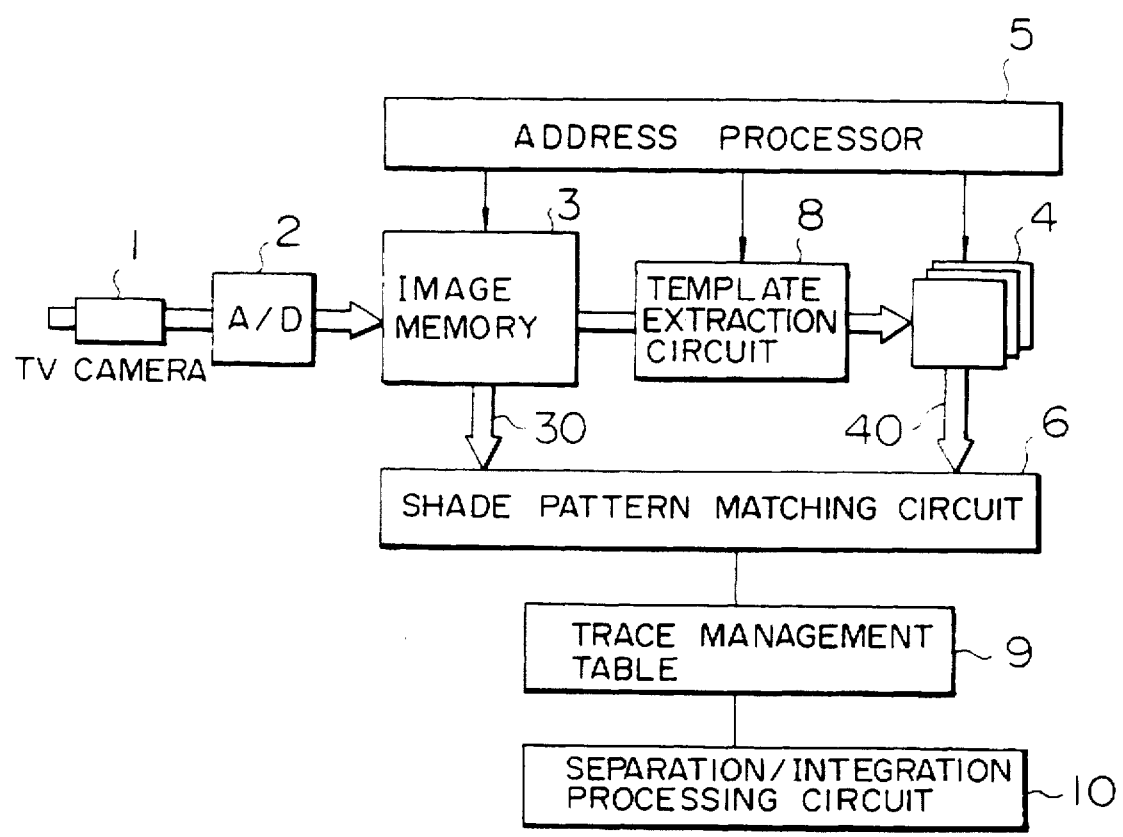
FIG. 1 is a block diagram for explaining an embodiment of the present invention.

FIG. 1 diagrammatically shows a configuration of a system according to the present invention. An image from a TV camera 1 or the like is applied to an image memory 3 through an A/D converter 2 for converting an analog data into a digital data. The image memory 3 is a shade image memory of about 8 bits. A shade template memory circuit 4, on the other hand, is for storing shade templates of a shaded image. The shade image memory 3 and the shade template memory circuit 4 are configured to scan the interior of the memory by an address processor 5. The shade template memory circuit 4 is for storing a template area cut out of an image through a template extracting circuit 8. The shade template memory circuit 4 also has a plurality of shade templates for storing various shade images. A shade pattern matching circuit 6 is for determining the matching between the image data 30 of the image memory 3 and the image data 40 of the shade template memory circuit 4, and for executing the normalized correlation calculation of normal level or less.

In normalized correlation of an input image f(x, y) against a shade template T(p, q), the similarity r(u, v) of the point of input image f(u, v) is given as $$r(u,v) = \frac{\left(pq \sum_{i=0}^{p} \sum_{j=0}^{q} \{f(u+i,v+j) \times T(i,j)\} - \left\{\sum_{i=0}^{p} \sum_{j=0}^{q} f(u+i,v+j) \sum_{i=0}^{p} \sum_{j=0}^{q} T(i,j)\right\}\right)^2}{\left(pq \sum_{i=0}^{p} \sum_{j=0}^{q} f(u+i,v+j)^2 - \left\{\sum_{i=0}^{p} \sum_{j=0}^{q} f(u+i,v+j)\right\}^2\right)} \times \frac{1}{\left(pq \sum_{i=0}^{p} \sum_{j=0}^{q} T(i,j)^2 - \left\{\sum_{i=0}^{p} \sum_{j=0}^{q} T(i,j)\right\}^2\right)} \quad (1)$$

where p, q are x, y sizes of a shade template, respectively. Any method of determining a correlation may be used to the extent that an effect similar to the above-mentioned method is obtained.

The operation of the image memory 3, the scanning of the shade template memory circuit 4 and the operation of the shade pattern matching circuit 6 are all controlled by a CPU (not shown). More specifically, the address processor 5 and the shade pattern matching circuit 6 are activated by the CPU, the image address given in Equation (1) is generated at the address processor 5, a data is read from the image memory 3 and the shade template memory circuit 4, a data is determined as required for similarity calculation at the shade pattern matching circuit 6, and the similarity r(u, v) is calculated at the CPU. A coordinate with a large similarity, once determined, is stored in a trace management table 9 for managing the "time", "abscissa" and "time", "ordinate". Then, the isolation/integration processing is effected by an isolation/integration processing circuit 10 against the trace management table. To explain the shade pattern matching circuit 6 briefly, the data relating to a shade template is capable of being calculated in advance, and therefore the data relating to an input image is calculated and transmitted to the CPU at the time of calculating a similarity. The data relating to an input image is determined by the calculation according to Equation (4) from Equation (2) through the shade pattern matching circuit 6 in the above-mentioned case. The same operation may be shared by the shade template memory circuit 4 and the image memory 3.

$$\sum_{i=0}^{p} \sum_{j=0}^{q} f(u+i,v+i) \quad (2)$$

$$\sum_{i=0}^{p} \sum_{j=0}^{q} f(u+i,v+j)^2 \quad (3)$$

$$\sum_{i=0}^{p} \sum_{j=0}^{q} \{f(u+i,v+i) \times T(i,j)\} \quad (4)$$

Figure 2A:
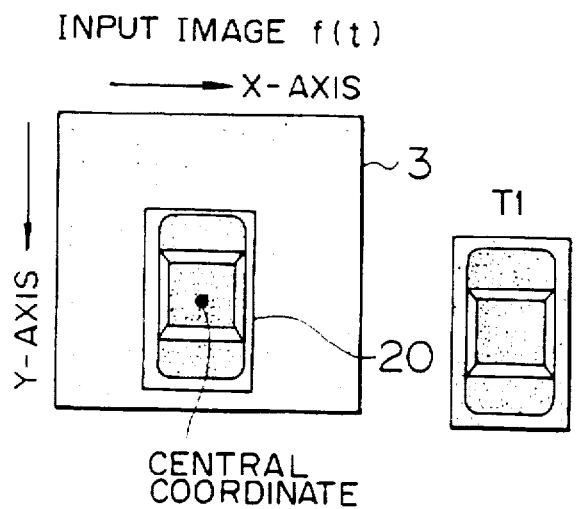
FIGS. 2A and 2B are illustrations showing an example of processing of shade pattern matching.
Figure 2B:
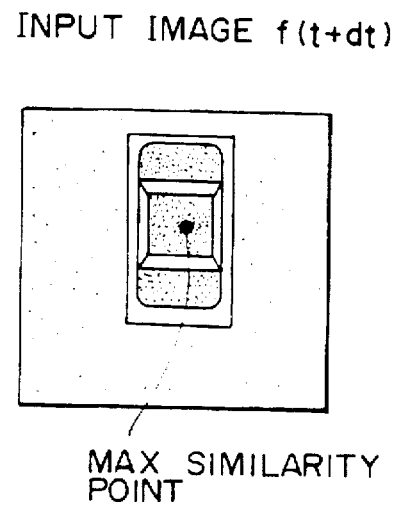

An example of shade pattern matching of an input image is shown in FIGS. 2A and 2B. In the case where a vehicle 20 is displayed on an input image f(t) at a time point t, a shade template T1 is cut out of the input image f(t), raster scanning is effected at the same time as pattern matching of an input image f(t+dt) at time point t+dt, and a coordinate is sought with an increased similarity r(u, v). Then, the maximum point of similarity is determined as shown in FIG. 2B.

As a result, the instantaneous speed and direction of vehicle movement can be determined from the maximum similarity point of time point t+dt and the vehicle existence coordinate (central coordinate of template) at a time point t.

Incidentally, the horizontal axis of an image memory is referred to as X axis, and the vertical axis thereof as Y axis.

The advantage of the above-mentioned normalized correlation processing is that to the extent that a registered shade template and an image pattern are similar to each other, a similarity to some degree is obtainable even when the brightness undergoes a change or an object is hidden to some degree by something (as when vehicles are superposed on two-dimentional display or when only a portion of a vehicle is visible due to a shadow of a building or the like). More specifically, even though similar to the road surface brightness, an object can be recognized as a vehicle as long as it has a vehicular shape. According to the conventional systems using binary-coding at a certain threshold value, recognition of a vehicle of low contrast is very difficult. The technique according to the present embodiment, on the other hand, facilitates extraction of a vehicle.

Vehicles to be recognized are of various sizes, types and colors. The processing by pattern matching is accompanied by the problem of size change. Pattern matching techniques disclosed in U.S. application Ser. No. 07/789,682 filed Nov. 8, 1991 are applicable to the present invention. The contents of that application is incorporated by reference herein. As far as the pattern matching of whole vehicles is executed, the recognition of vehicle size is required in advance, thereby making it difficult to apply the system to vehicles passing at random. When a human being observes the movement of an object of considerable size, therefore, the whole of the particular object is not always followed, but the movement of a specified point thereof is followed, so that points where the movements are identical in speed and direction are finally integrated to recognize a large object. In other words, a plurality of partial templates smaller than a vehicle are prepared, and a shade pattern matching is effected for each template. The templates, for which shade patterns are matched and the resulting speeds and directions, are judged to be similar to each other and are integrated to represent the same vehicle independently of the size. In the case where no moving object exists in a registered template (in the case of an image of the road surface alone), the maximum point of similarity cannot be defined or displaced from the central coordinate of a registered template.

Figure 3A:
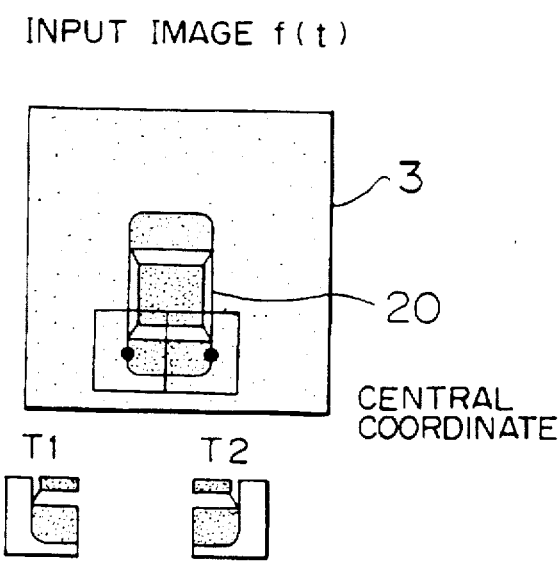
FIGS. 3A and 3B are illustrations showing an example of processing of partial shade pattern matching.
Figure 3B:
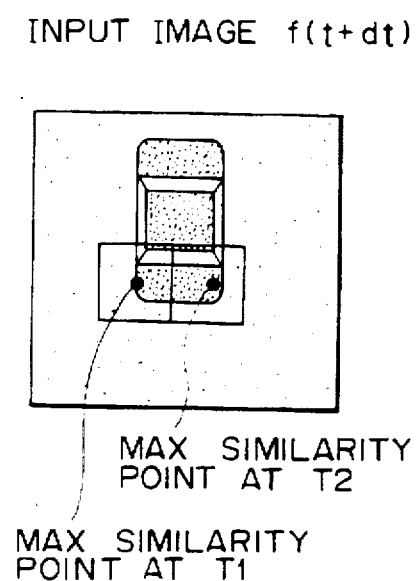
Figure 4:
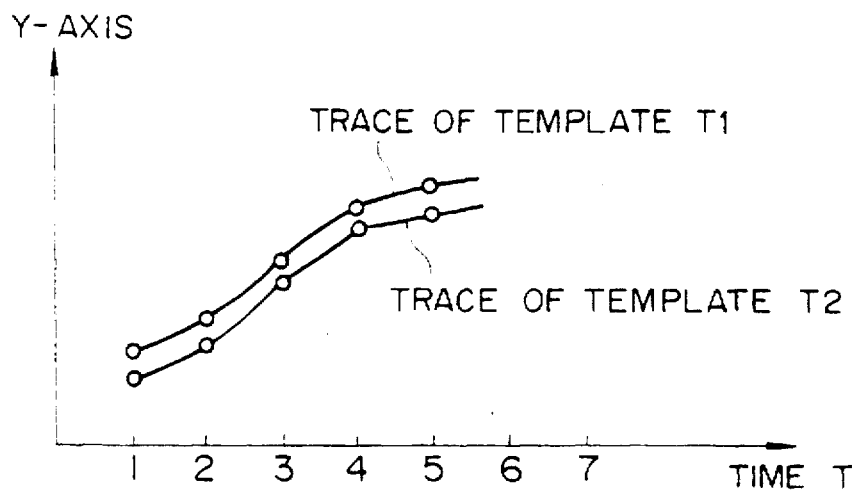
FIG. 4 is a diagram showing traces of "time" and "ordinates" obtained by partial shade pattern matching.
Figure 5:
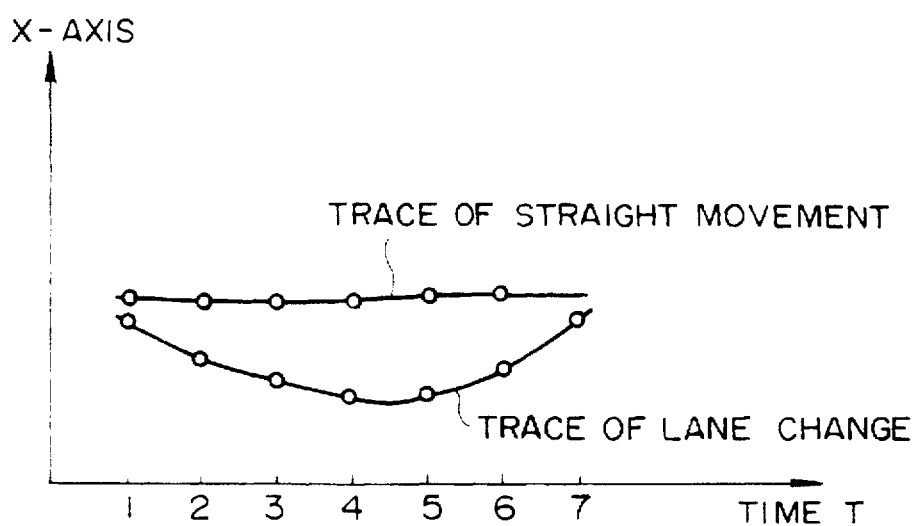
FIG. 5 is a diagram showing traces of "time" and "abscissa" obtained by partial shade pattern matching.
Figure 6:
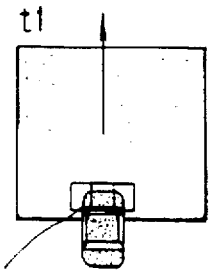
FIG. 6 is a diagram showing a model of an object image with moving objects followed by the partial correlation integration method.
Figure 6:
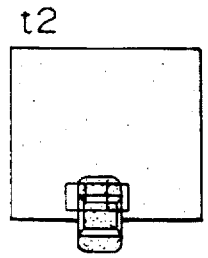
Figure 6:
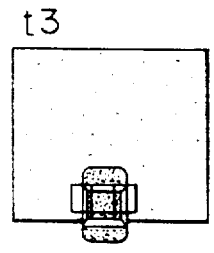
Figure 6:
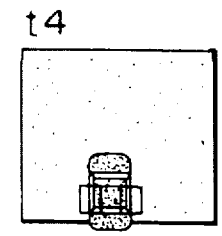
Figure 6:
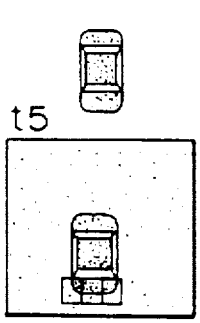
Figure 6:
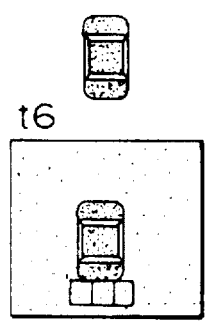
Figure 6:
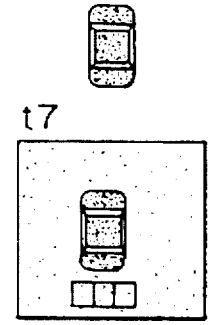
Figure 6:
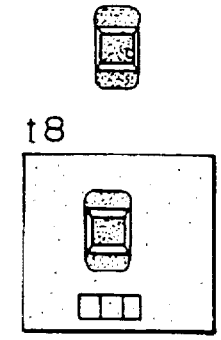
Figure 6:
Figure 6:
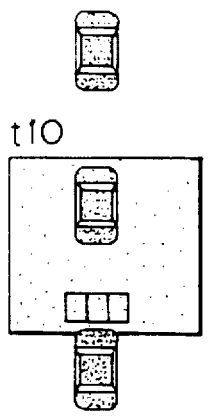
Figure 6:
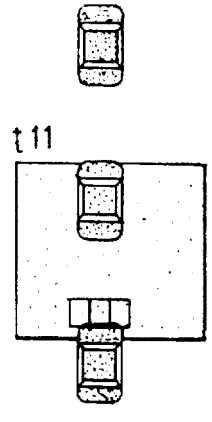
Figure 6:
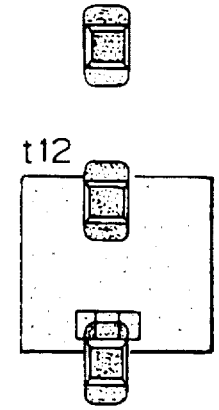
Figure 6:
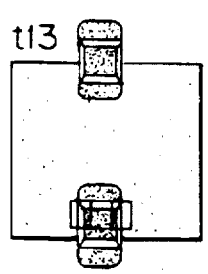
Figure 6:
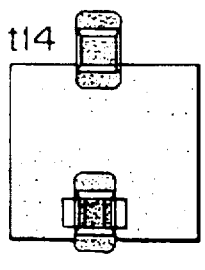
Figure 6:
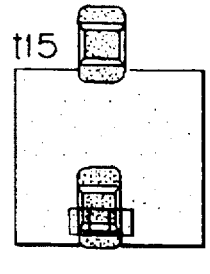
Figure 6:
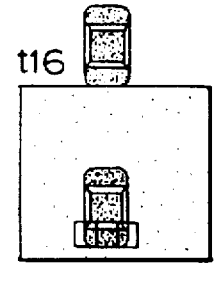

As will be described in detail with reference to FIG. 3, partial areas smaller than the vehicle size are set in an input image. In FIGS. 3A and 3B, templates T1 and T2 are set. These partial areas are registered as templates respectively, and matched with sequentially-applied images to determine the maximum point of matching for each template. If this condition is expressed as "time" along abscissa and as "ordinate" along vertical axis as shown in FIG. 4, a trace can be determined for each template, where the unit along time axis corresponds to a sampling interval of image input. When an image is introduced for every three frames, for example, the unit is 3×1/30=100 ms. This management is effected at a trace management table 9. In view of the delicate difference in matching point with each template, the moving speed (displacement of ordinate) undergoes a change. Nevertheless, substantially similar behaviours are obtained due to the fact that the partial templates are for the same vehicle. As a result, an integration processing of these templates makes it possible to execute the recognition of a whole vehicle. An integration processing is executed at an iteration processing circuit 10. FIG. 5 is a diagram showing traces plotted as "time" along abscissa and "X coordinate" along ordinate. The discrimination of straight run and lane change is made possible by recognizing the format of the traces. FIG. 6 shows a detailed case involving two passing vehicles, in which images inputted at intervals of a certain unit time over a period from t1 to t16 are processed. Templates carry shade images of three partial areas at the lower part of the screen entered by the vehicle.

The processing steps will be briefly explained below.

(1) Three partial templates T1(t1) to T3(t1) for the front part of a vehicle are registered in the image of time point t1, where t designates time, and T a template.

(2) The shade pattern matching is effected for the image of time point t2 by use of the registered templates T1(t1) to T3(t1). As a consequence, moving traces are determined for the partial templates T1(t1) to T3(t1).

(3) Three partial templates T1(t2) to T3(t2) are registered also for the image of time point t2.

(4) In similar fashion, the shade pattern matching is effected for the image of time point t3 using the templates T1(t1) to T3(t1) and T1(t2) to T3(t2). As a result, moving traces are obtained for the partial templates T1(t1) to T3(t1) and T1(t2) to T3(t2).

Figure 7:
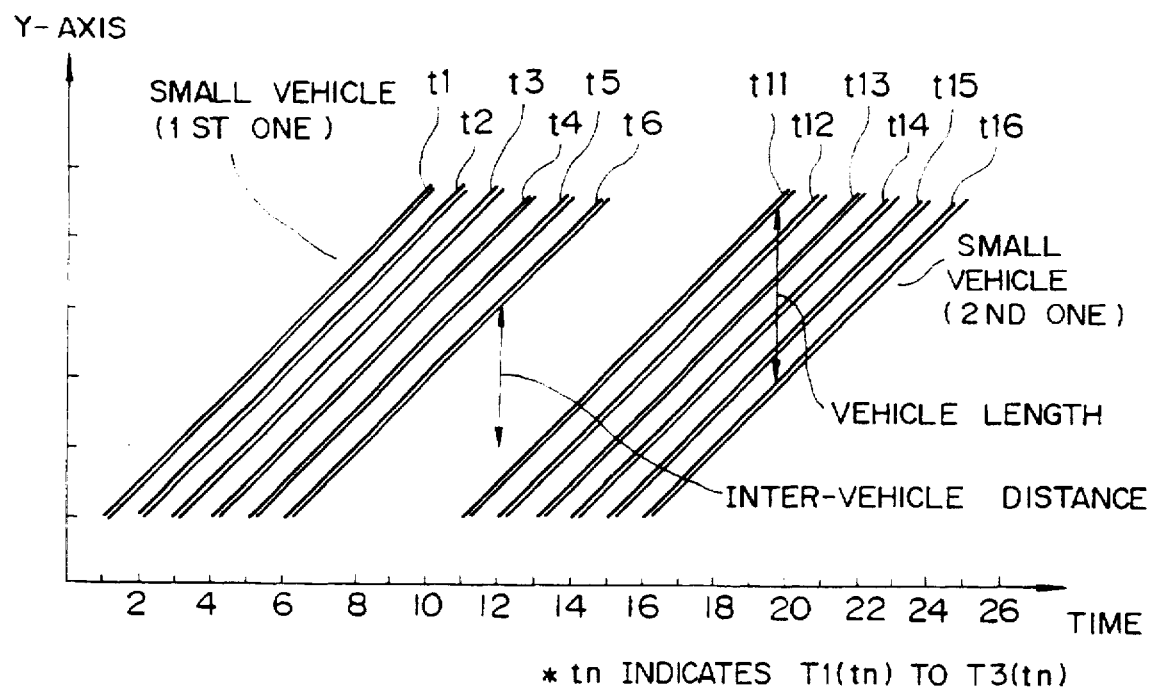
FIG. 7 is a diagram showing traces of "time" and "ordinates" obtained by processing according to the partial correlation integration method.

(5) The above-mentioned steps of processing are sequentially repeated. In other words, the registration of partial templates at a given time point and the shade pattern matching between the partial templates registered at the preceding time points and the present image are sequentially repeated in parallel. The traces for respective partial templates are thus obtained as shown in FIG. 7. Traces for the same vehicle are located close to each other in distinction from other vehicles. The interval between two groups of close traces represents the distance between two vehicles running in the same direction, and the width of each trace group the vehicle length. The inclination of the traces, on the other hand, represents the vehicle speed.

(6) The partial templates are separated and integrated. In the case of FIG. 7, for example, the partial templates T1(t1) to T3(t1) are processed on the assumption that they represent the same object.

It will be seen that the vehicle behaviour recognition is easily executed by using this technique.

A specific example of each process will be explained below.

1. Method of Separation and Integration Processings

The separation and integration processings after determining the moving point of each template may be executed by the technique as described below.

1.1 Integration Processing (1) The trace of each template is approximated by curve according to the least square method or the like, and those partial templates having small mutual distances are integrated.

(2) The knowledge about an object image (relating to the concentration distribution, shape, etc.) is prepared, and determination is made which part of the object is represented by the shape of a given template. In this way, all the templates are integrated. In the case of a vehicle, for example, assume that a template 1 represents "the left image of the tail lamp", a template 2 "the right image of the tail lamp", and a template 3 "the central image of the rear window". This knowledge permits the determination that the template 2 is positioned to the right of the template 1, and the template 3 is arranged above them. In other words, the templates 1 to 3 are determined to represent the same object.

The size of a template is such that initial partial templates may be processed always as such (in the form of a hypothetical large template) and, after integration, as a template covering a rectangular area containing all the integrated partial templates.

1.2 Separation Processing (1) In the case where the feature amount (for example, average concentration) of some of the integrated templates suddenly increases, they are separated from the integrated pattern.

(2) The templates thus integrated are assumed to be coupled under a certain resistance. In the case where the behaviour of a given template is different from that of another template connected thereto, therefore, they are left integrated if the behaviour is not to such a degree as to cut off the resistance. If the difference is so great as to cut off the resistance, on the other hand, the affected template is separated. The resistance may be defined as a weight representing the strength of coupling or a function representing the degree of coupling.

2. Method of Limiting Search Range

Figure 8:
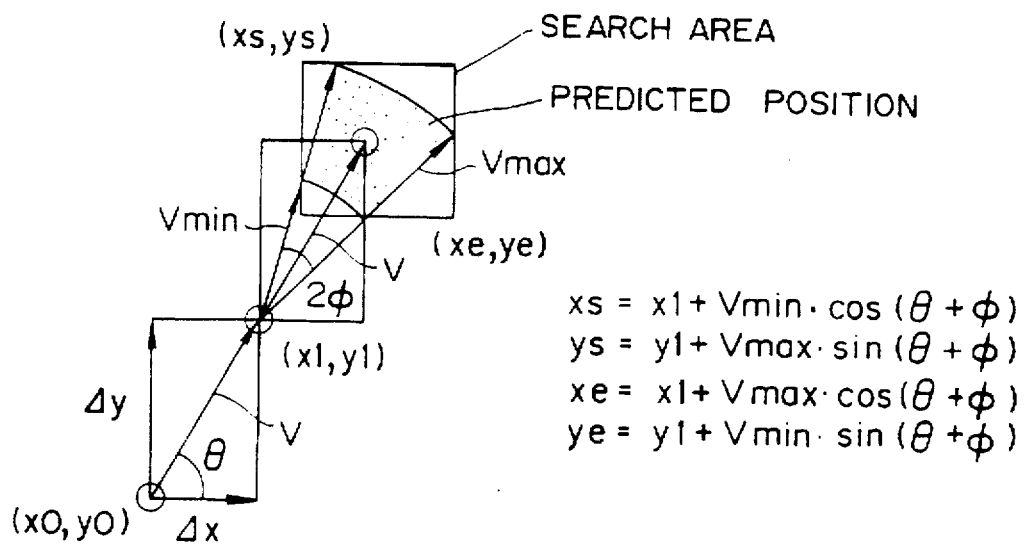
FIG. 8 is a diagram showing a search area limitation method applied in following a moving object.
Figure 9:
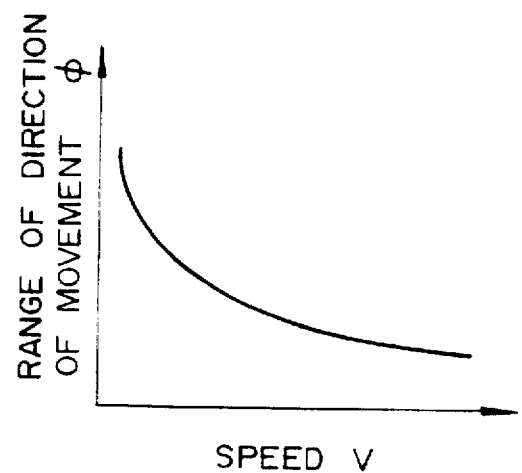
FIG. 9 is a diagram for explaining the relation between the speed of a moving object and the range of direction in which it moves.

In recognizing the behaviour of a vehicle running along the road, full scanning of the correlation calculation of registered templates is not always necessary. More specifically, in view of the fact that the range of movement of a vehicle is limited to some extent, the next range of search can be specified by the past behaviour of the vehicle. The processing time of the similarity calculation is proportional to the number of picture elements (the sizes of templates and search range), and therefore, the search range should be reduced as far as possible. An example is shown in FIG. 8. In the case where a vehicle moves from the coordinate (x0, y0) to (x1, y1), for instance, it is possible to specify the next search area by using the moving speed V and the direction of movement θ. A predicted position is included in a fan-shaped range shown in FIG. 8 as determined from the minimum speed Vmin, the maximum speed Vmax and the amount of change in the direction of movement 2θ against the preceding moving speed V. To simplify the processing, the rectangular area surrounding the fan-shaped area is used as the next search range. Such a search range is determined according to Equations (5) to (8) below.

$$xs = x1 + Vmin \cdot \cos(\theta + \phi) \tag{5}$$

$$ys = y1 + Vmax \cdot \sin(\theta + \phi) \tag{6}$$

$$xe = x1 + Vmax \cdot \cos(\theta - \phi)) \tag{7}$$

$$ye = y1 + Vmin \cdot \sin(\theta - \phi)) \tag{8}$$

where (xs, ys) represents the starting coordinate and (xe, ye) the final coordinate of an area. The range φ of the vehicle direction may be changed as a function of the speed V as shown in FIG. 9. Assume that the object of recognition is other than a vehicle which is simple in behaviour pattern, or, that a human being, an animal or the like object is to be recognized and followed, for example, a simple search range as determined above is sometimes insufficient. In view of this, the past behaviour pattern is learned by a neural network in order to specify the next mobile range from the traces of past movement. If this behaviour pattern is used for prediction of the future behaviour, the resulting search range which will be more detailed is expected to reduce the processing time.

Figure 10A:
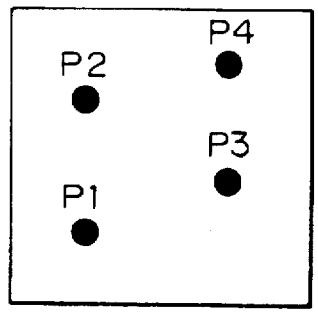
FIGS. 10A and 10B are diagrams for explaining the search area for each template applied in following a moving object.
Figure 10B:
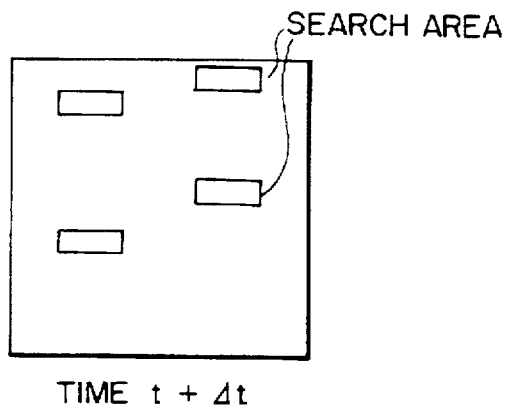

As a result, in following the vehicle coordinates P1 to P4 determined at a time point t as shown in FIG. 10A, a search area can be determined as shown in FIG. 10B, thus remarkably reducing the processing time.

3. Method of Updating Templates

Figure 11:
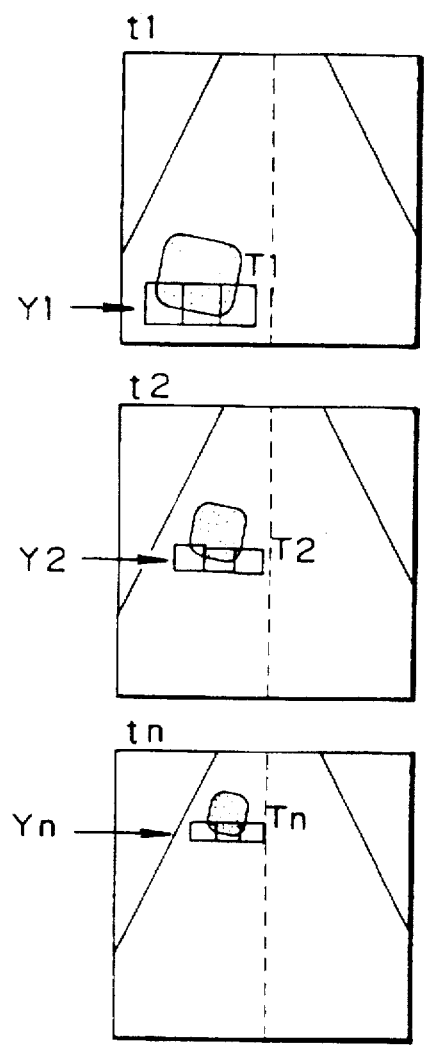
FIG. 11 is a diagram for explaining a template size determination method with a bird's eye view of a road.

In spite of the fact that the foregoing description concerns the case in which a road is viewed from right above, it is almost impossible actually to photograph a road from overhead. A bird's-eye view of a road is the result. In such a case, a vehicle appears smaller with the ascendance in the screen as shown in FIG. 11. In the method of following a vehicle according to the above-mentioned correlation calculation method, therefore, a vehicle located at a far point cannot be detected and therefore cannot be followed, although detection is possible of vehicles appearing to be of the same size as the registered shade templates. This problem never fails to arise in applications involving a wide monitor range such as in monitoring human intruders or watching railroad crossings.

In view of this, a shade template is updated while following the movement of vehicles as shown in FIG. 11. More specifically, in the case where templates with the ordinate centered at Y1 is registered from the image of time point t1, assume that a similarity point is detected at the ordinate Y2 by shade pattern matching of the image of time point t2. The template size in registration is reduced in accordance with the ratio determined by the coordinate Y2, and the shade image at time point t2 in the vicinity of the similarity point is registered again as a template. The shade template newly registered is used for matching in the next search area. Sequential executions of this process permits the versatile operation of following vehicles against changes in vehicle size. This method has been developed on the basis of the fact that the size and direction of movement of a vehicle does not substantially change instantaneously but slowly.

A template may be prepared, instead of by the above-mentioned method using a latest input image, alternatively according to the average ((f+g)/2) of the preceding template image (g) and an image newly detected in the vicinity of a vehicle position (f) or a linear coupling calculation (αf+βg, α+β=1).

Figure 12:
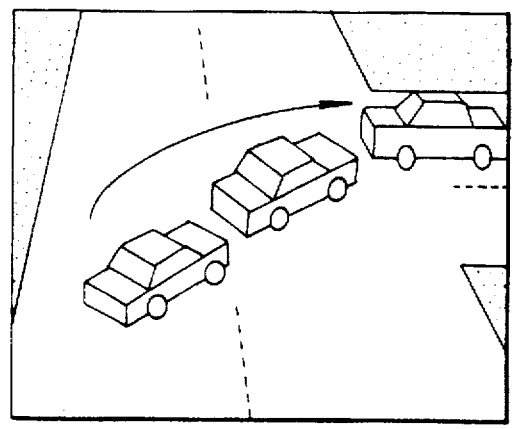
FIG. 12 is a diagram for explaining the vehicle movement at an intersection.

Assume that the number of vehicles turning to the right at an intersection is measured by using the above-mentioned technique as shown in FIG. 12. In view of the fact that the vehicles turning to the right change the direction thereof gradually, the following of a vehicle ceases midway with a single shade template. The following of vehicles, however, is facilitated by updating the shade template at the same time. Also, the movement of a human being constantly changing in shape is capable of being followed by updating a template as described above.

Figure 13:
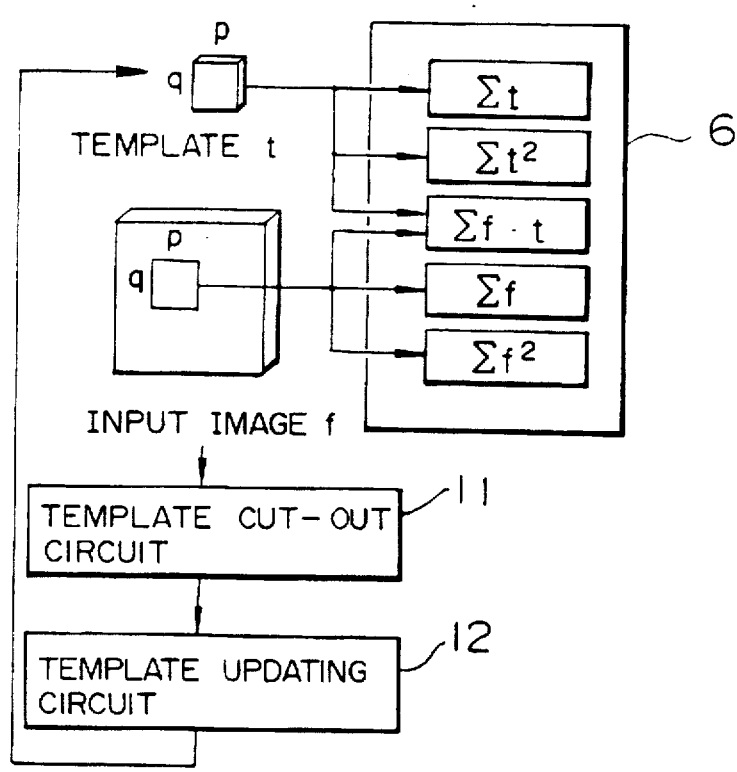
FIG. 13 is a diagram showing an example of a shade pattern matching circuit used for updating the template.

When a shade template is updated, however, the data relating to the shade template in the calculation of Equation (1) mentioned above cannot be determined in advance. This value is thus required to be determined with rapidity. In view of this, a circuit may be added as shown in FIG. 13 for acquiring the data on the shade template T (i, j), so that with the registration of a shade template, the calculations of Equations (9) and (10) are executed to always permit high-speed processing.

$$\sum_{i=0}^{p} \sum_{j=0}^{q} T(i,j) \tag{9}$$

$$\sum_{i=0}^{p} \sum_{j=0}^{q} T(i,j)^2 \tag{10}$$

where p, q are constantly variable with the size of the shade template.

A template is extracted from an input image by a template extracting circuit 11. The next template is prepared at a template update circuit 12 by averaging or linear coupling of the template thus extracted and the preceding template. The resulting template is registered and used for the next operation of following vehicles. A device for continuous following operation is thus configured.

4. Size of Template

Figure 14A:
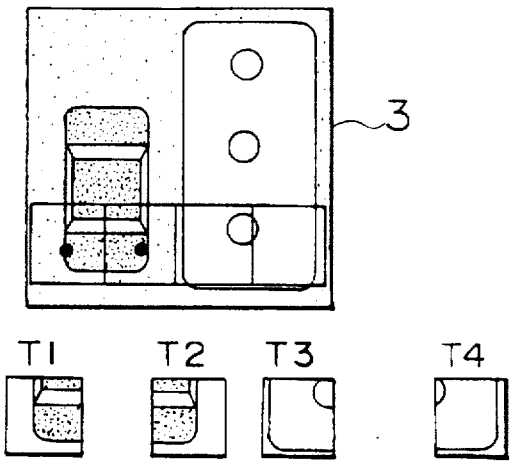
FIGS. 14A and 14B are illustrations showing the processing executed when vehicles are running in parallel.
Figure 14B:
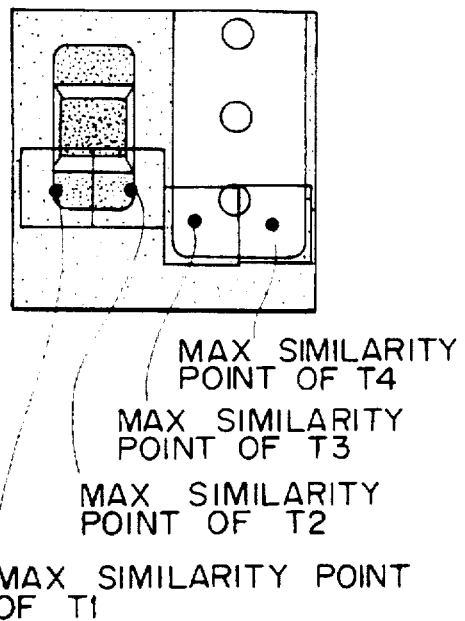
Figure 15:
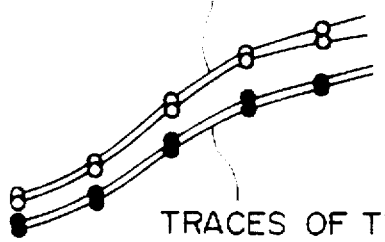
FIG. 15 is a diagram showing traces of "time" and "ordinates" plotted when vehicles are running in parallel.

Any case of vehicles running in parallel is not described above. Actually, however, a road often has two or three lanes, and therefore, it is necessary also to be able to process the recognition of vehicles running in parallel. A case of recognition of the behaviour of vehicles running in parallel is shown in FIGS. 14A and 14B. Templates T1 to T4 are registered with respect to an input image as shown in FIG. 14A. When these templates are used to follow the vehicle behaviour by shade pattern matching against an input image of time point t+dt, a matching point is detected for each template. If a moving trace is plotted as "time" along abscissa and "ordinate" along vertical axis, the diagram of FIG. 15 is obtained. It will be noted that in the case where the speed and direction of movement of two vehicles are substantially identical to each other, mere analysis of the traces shown in FIG. 15 cannot discriminate small and large vehicles.

Figure 16:
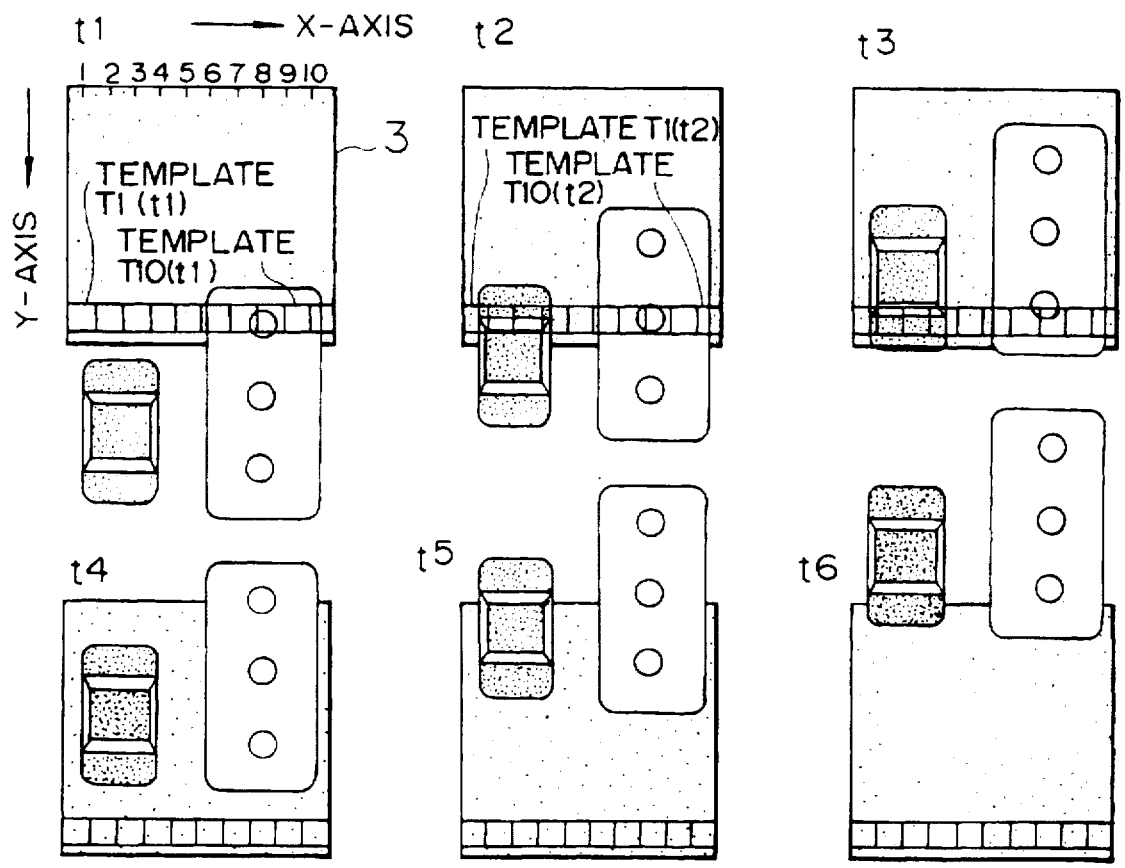
FIG. 16 is a diagram for explaining a method of assuring satisfactory processing even when vehicles are running in parallel.
Figure 17:
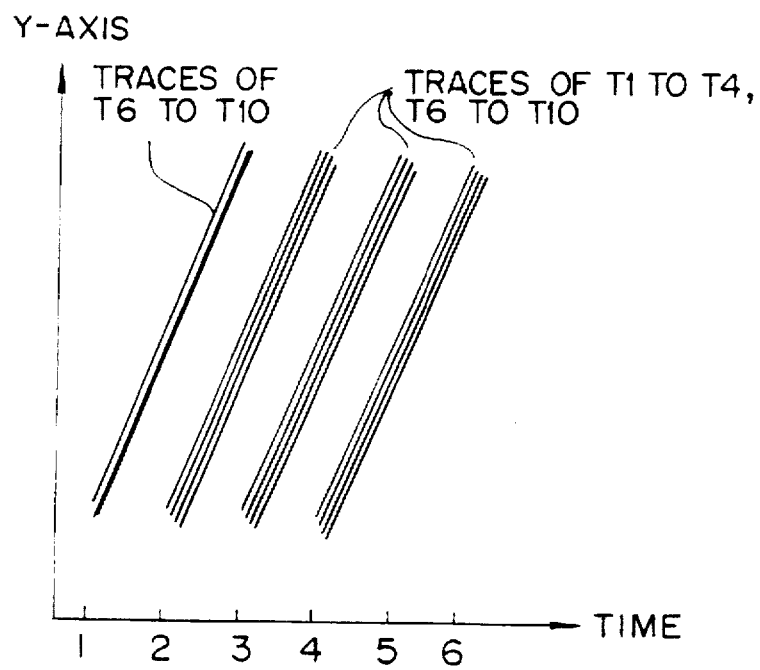
FIG. 17 is a diagram for explaining traces of "time" and "ordinate" plotted using a method of assuring satisfactory processing even when vehicles are running in parallel.
Figure 18:
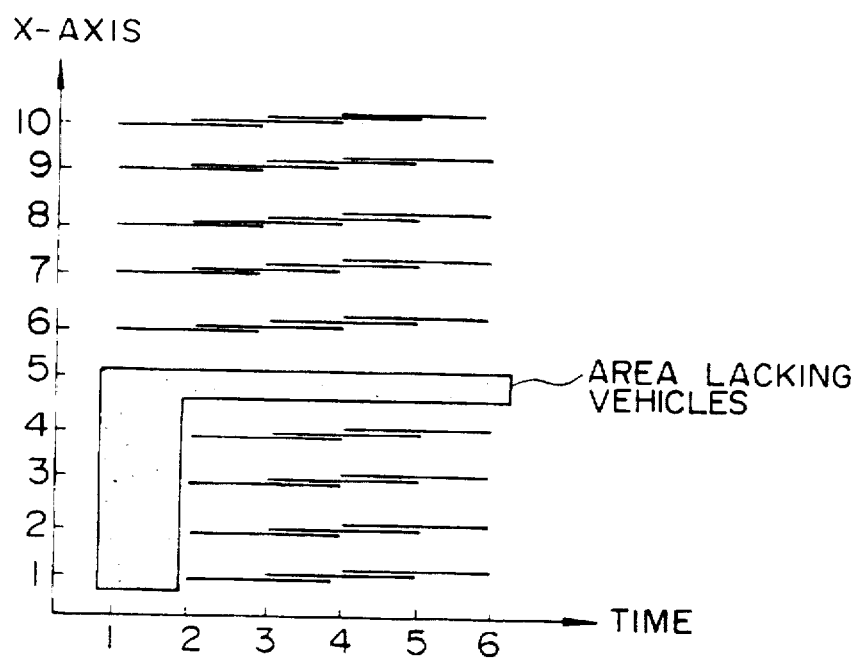
FIG. 18 is a diagram for explaining traces of "time" and "abscissa" plotted using a method of assuring satisfactory processing even when vehicles are running in parallel.

This is due to the fact that the area on a road separating the two vehicles fails to be recognized. More specifically, a template exclusively covering the road cannot be registered, if each template is excessively large in size. It is, therefore, important to set the template width to not more than the vehicle intervals (along X direction). The operation with a reduced template size is shown in FIG. 16. One or more templates (corresponding to T5 in the case under consideration) of a size smaller than the interval between vehicles are always provided and are followed with the shade pattern matching described above. The time-ordinate and time-abscissa relationships in this state are shown in FIG. 18. In the time-ordinate graph, which templates are associated with the same vehicle is unknown when two vehicles are running at substantially the same speed. From the observation of the time-abscissa graph, however, an area lacking a vehicle is detected, and therefore the templates T1 to T4 and T6 to T10 are known to belong to the same vehicle.

As explained above, it is important to set the template width (along X direction) to not more than the interval between vehicles in order to enable a separating point to be recognized between vehicles. At the same time, the template length (width along Y direction) may be of any size if in a range processable by correlation calculation (such a size as to permit grasping the features of the vehicle).

5. Method of Template Registration

A method of registering a template will be explained. A method of extracting a template followed includes using an image of a predetermined area (the simplest method being by using templates arranged on the vehicle-incoming side as shown in FIG. 16) always as a template. According to this method, however, a vehicle cannot be followed if it reappears after being hidden behind a large vehicle or the like. In view of this, a shade image of input associated with a unique point of the whole image, such as the one with a large differentiation value (spatial frequency feature) or the one with a large difference between images obtained by differentiations taken at predetermined time intervals is set as a template, and each template thus set is followed by the correlation calculation. These templates may be combined with images on the vehicle-incoming side.

As another alternative, a learning processing is effected in such a manner as to extract an object directly from an image by use of a neural network, and a candidate image of a moving object is directly extracted by use of the result of learning, so that a shade image of an input corresponding to the particular area is extracted as a template.

By sequentially executing this processing, even if a vehicle appears in the midst of processing, the following of vehicles becomes possible at and after the time of appearance.

6. Method of Correlation Calculation

Figure 19A:
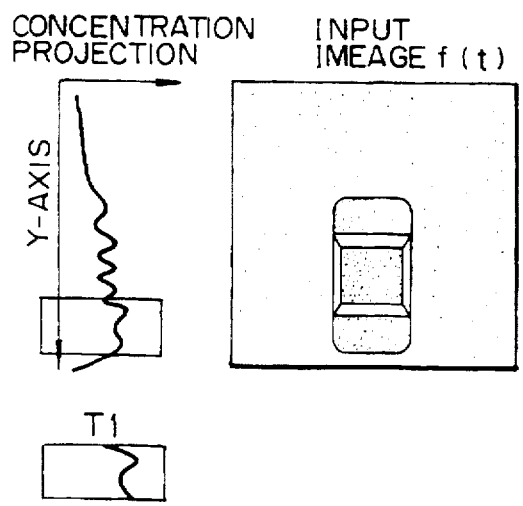
FIGS. 19A and 19B are illustrations for explaining a technique for following a vehicle by correlation calculation on the basis of a shade projection distribution.
Figure 19B:
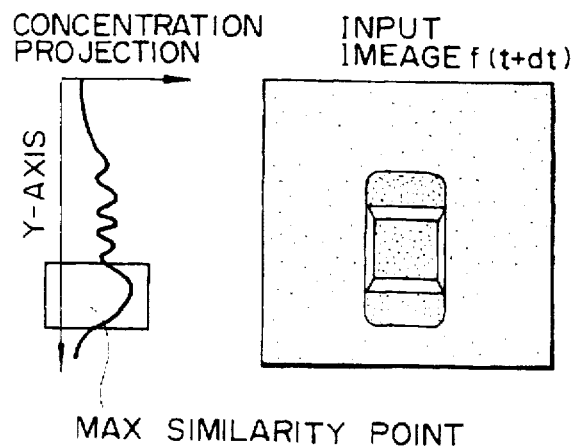
Figure 20A:
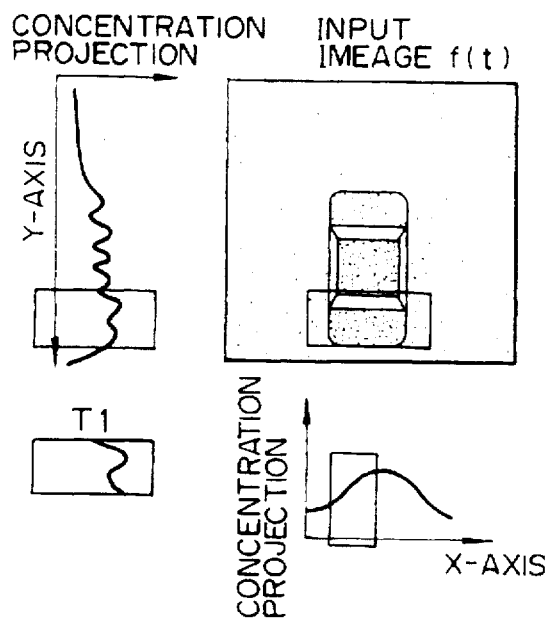
FIGS. 20A and 20B are illustrations showing a method of following a vehicle along abscissa with correlation calculation-on the basis of a shade projection distribution.
Figure 20B:
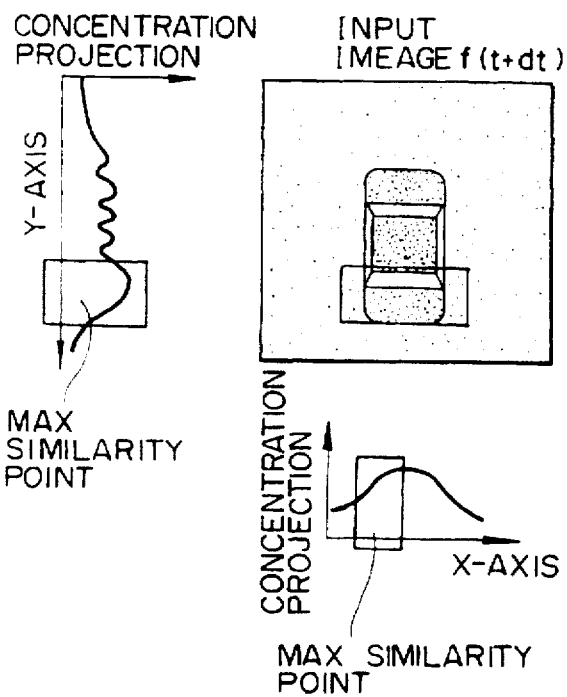

Although the above-mentioned "partial correlation integration method" is for executing the two-dimensional correlation calculation, the "method of correlation integration by concentration projection" involving a simplified processing has a similar effect. As an outline is shown in FIGS. 19A and 19B, the correlation calculation is effected on the basis of a one-dimensional concentration distribution for determining a concentration projection (concentration accumulation) along ordinate for each lane. If a partial pattern within a predetermined width of this projection distribution is followed as a template, the amount of movement along ordinate is determined. The change in abscissa, however, cannot be detected. If the detection along abscissa is to be executed, the projection (concentration accumulation) along abscissa of the concentration in the vicinity of a matching point along ordinate is determined when the particular matching point is obtained as shown in FIGS. 20A and 20B, and the correlation with a template in registration is defined. In this way, the change along ordinate is determined. The general procedure for the above-mentioned method is the same as the "method of partial correlation integration". Templates may be registered by a method placing sole emphasis on the change points of the projection distribution. The advantage of this method lies in that the processing time is reduced considerably as compared with the "partial correlation integration method" described above due to the fact that the template is one-dimensional.

Although the above-mentioned methods refer only to the correlation calculation of a shade image, the binary template matching or hierarchical pattern matching (both shade and binary) which have so far been employed may be executed. In such a case, too, it is important to utilize the size, separation/integration of templates or updating of template patterns.

The "method of partial correlation integration" and "method of partial correlation integration by concentration projection" according to the present invention can be used for wider applications. Apart from the human being or vehicles as an object, these methods are applicable also to the operation of following other types of moving objects. Some applications include:

(1) Detection of stationary vehicles: By following vehicle traces, the position where a vehicle has stopped is determined. The illegal parking, etc. is thus detectable.

(2) Management of parking lot: A parking lot is monitored from a high point to recognize an unoccupied area by following vehicle traces.

(3) Monitoring crossings: Whether any vehicle stays within the crossing range is recognized. The vehicle behaviour is a simple movement along lateral direction (or along vertical direction depending on the camera position), and therefore vehicles can be followed in simple fashion.

(4) Monitoring intruders (security): Whether any suspicious person has intruded during the night time, for instance, is recognized. Since a human being is an object of recognition, a partial template smaller than the width of the human being should be used. The detection of an intruder into the railroad track from the station platform can also be processed.

According to the present embodiment, the behaviour of an object is accurately detectable by the partial correlation integration method even in the case of low contrast or superposed objects. This compares with the conventional methods in which an input image is binary-coded or a threshold value is set for a binary projection distribution, with the result that tuning is difficult with the processing performance subject to a considerable variation depending on such conditions as environments including brightness and shadow.

The present embodiment, which lacks binarized threshold values, eliminates the tuning, and is applicable to environmental changes in versatile fashion. Also, moving objects can be followed by shade pattern matching by the updating of shade templates even in the case where the shapes of templates stored and the moving objects to be followed undergo a change. The invention is thus easily realizable for recognition of vehicles turning to the right at crossings or the behaviour of human beings. In addition, templates are traced as partial templates, and separated and integrated in post-processing, so that objects of varying sizes can be easily recognized.

Another embodiment of the present invention will be described below with reference to the accompanying drawings.

Figure 21:
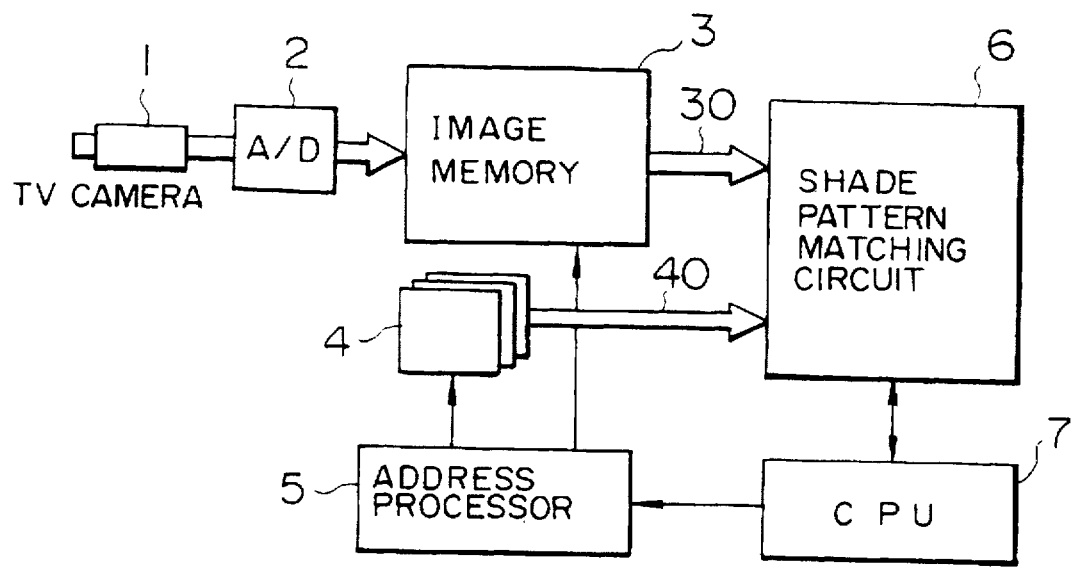
FIG. 21 is a diagram for explaining another embodiment of the present invention.

FIG. 21 is a block diagram showing a configuration of a vehicle recognition system according to another embodiment of the present invention. The image of a road taken by a TV camera 1 or the like is applied to an image memory 3 through an A/D converter for converting an analog into a digital data. A shade image memory of about 8 bits (256 gradations) is used as the image memory 3 according to the present embodiment. This vehicle recognition system includes a shade template memory circuit 4 for storing shade templates of shade images (8 bits and 256 gradations) of a vehicle. The shade image memory 3 and the shade template memory circuit 4 are so configured as to scan the interior of an memory by an address processor 5. The shade template memory circuit 4 has a plurality of shade templates which have stored therein shade images of various vehicles taken from various angles. The shade pattern matching circuit 6 is for matching between the image data 30 of the image memory 3 and the image memory 40 of the shade template memory circuit 4, and executes the normalized correlation calculation as shown by Equation (1). This embodiment is configured with the template cut-out circuit 8, the trace management table 9 and the separation/integration circuit 10 eliminated from the system shown in FIG. 1.

Any method of correlation processing having a similar advantage may be employed with equal effect.

The operation of the image memory 3, the scanning and shade pattern matching circuit 4 and the operation of the shade pattern matching circuit 6 are controlled by the CPU 7. More specifically, the address processor 5 and the shade pattern matching circuit 6 are activated by the CPU 7, an image address of Equation (1) is generated at the address processor 5, the data on the related address of the shade template memory circuit 4 and the image memory 3 is read out, the data required for similarity calculation is determined at the shade pattern matching circuit 6, and the similarity r(u, v) is calculated at the CPU 7.

The shade pattern matching circuit 6 will be briefly explained. The data relating to the shade template is capable of being calculated in advance. At the time of similarity calculation, therefore, the data relating to the input image is calculated and transmitted to the CPU 7. The data relating to the input image, in the case of Equation (1), is obtained at the shade pattern matching circuit 6 by the calculation of Equations (2) to (4).

Figure 22A:
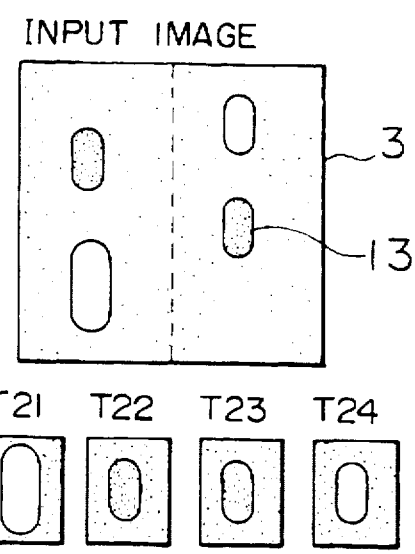
FIGS. 22A and 22B are illustrations showing an example of the processing of shade pattern matching.
Figure 22B:
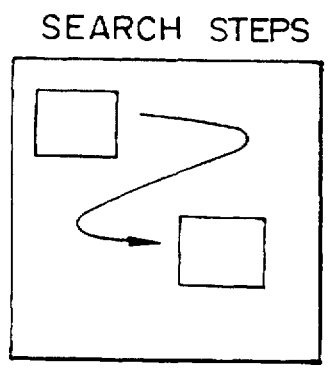
Figure 23A:
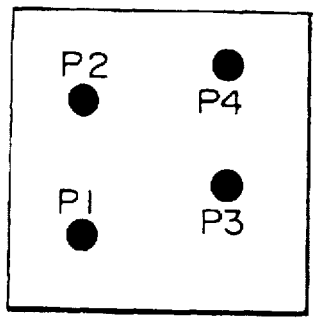
FIGS. 23A and 23B are diagrams showing the coordinates detected by shade pattern matching.
Figure 23B:
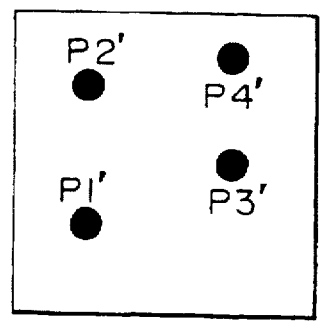

A diagram for explaining the shade pattern matching against an input image is shown in FIGS. 22A and 22B. Assume that four vehicles 13 are in the view as an object of matching as shown in FIG. 22A. Shade templates representing the color and size (shape) of the vehicles are required to be prepared. While scanning with the pattern matching effected with a shade template T21 as shown in FIG. 22B, for example, a coordinate associated with an increased similarity r(u, v) is searched for. A point P1 is determined as shown in FIG. 23A. In similar manner, the scanning with shade templates T22 to T24 makes it possible to determine points P2 to P4 as shown in FIG. 23A. As a result, once the coordinates of vehicle position at time point t and at time point t+Δt are determined as shown in FIG. 23B, the instantaneous moving speed and direction of each vehicle can be calculated.

The advantage of the afore-mentioned normalized correlation processing is that to the extent that the pattern and the image of shade templates in registration are similar, a similarity is obtained to some degree even when brightness changes or a vehicle is hidden behind something (as in the case of vehicles superposed or hidden partially in the shadow of a building). More specifically, even a vehicle bearing a color similar to the brightness of the road surface can be recognized as a "vehicle" from the shape thereof. In conventional systems, the binary-coding operation at a certain threshold value makes it very difficult to recognize a vehicle of low contrast. The method according to the present embodiment, by contrast, permits easy extraction of a vehicle.

In recognizing the behaviour of a vehicle running along the road, full scanning for vehicle search as shown in FIG. 22B is not always required. More specifically, in view of the fact that the moving range of a vehicle is limited to some degree, the next search range can be specified from the preceding behaviour of the vehicle. The limitation of the search range is executed in the same way as in the embodiment described above with reference to FIGS. 8 to 10A, 10B and Equations 5 to 8 and will not be explained again.

Now, explanation will be made with reference to FIGS. 24A to 24D about an example in which a vehicle is followed actually.

Figure 24A:
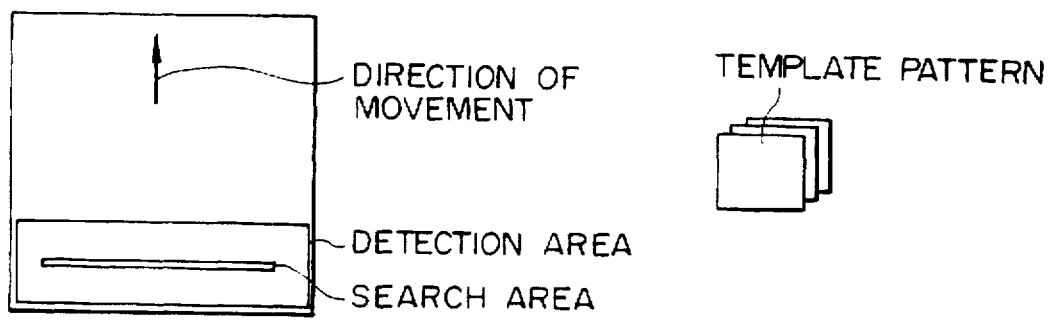
FIGS. 24A to 24D are diagrams for explaining the manner in which a moving object is followed.
Figure 24B:
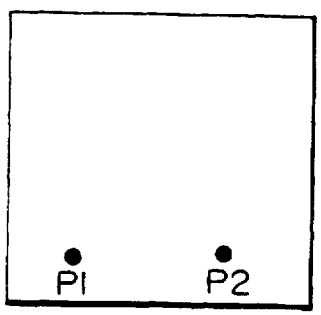
Figure 24C:
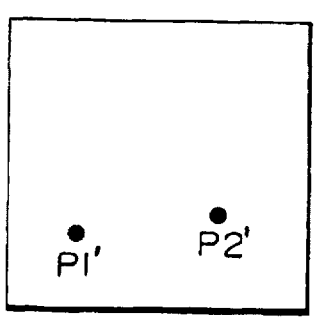
Figure 24D:
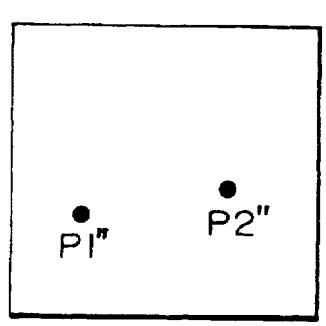

FIG. 24A shows the case in which vehicles move upward in the screen. Vehicles are required to be followed sequentially by the images thereof entering the screen. For this purpose, a detection area is set at the lower part of the screen, and vehicle images entering this portion are followed upward. Several shade templates are prepared. First, a vehicle is detected in a search area. More specifically, the similarity processing is executed in the search area for each shade template. Assuming that vehicles are detected at coordinates P1 and P2 as shown in FIG. 24B at time point t as a consequence, a following table is prepared as Table 1, in which the coordinates P1 and P2 are registered at Xold and Yold, respectively.

TABLE 1

Conditions at time t

| flag | Xold | Yold | Tno | Timeold | x1 | Y1 | Time1 | X2 | Y2 | Time2 | Next search area |
|------|------|------|-----|---------|-----|-----|-------|----|----|-------|------------------|
| 1 | x0 | y0 | 3 | t | x0 | y0 | t | 0 | 0 | 0 | xs, ys, xe, ye |
| 1 | x10 | y10 | 5 | t | x10 | y10 | t | 0 | 0 | 0 | |
| . | | | | | | | | | | | |
| . | | | | | | | | | | | |

At the same time, the shade template number Tno and the time Timeold are registered. Since the initial states of following are involved, Xold, Yold and Timeold are registered at X1, Y1 and Time1 respectively, and "0" at X2, Y2 and Time2. X1, Y2 and Time1 represent the preceding coordinate and time, and X2, Y2 and Time2 represent the present coordinate and time for following vehicles. Further, due to the initial stages, the preceding speed and direction of movement are not determined. As the next search area, therefore, the initial moving speed of "0" to maximum speed (150 km/h on an expressway, for example) and the initial change amount of the direction of movement of, say, 30 degrees, are set, with a moving range designated (xs, ys, xe, ye are calculated with Vminat 0 km/h, Vmax at 150 km/h, θ at zero degree and φ at 30 degrees). An image at time point t1 is inputted, and the similarity is calculated with a shade template with Tno of "3" with respect to the search area for vehicle P1. As shown in Table 2, the point P1' of maximum similarity is substituted into the coordinate (X2, Y2).

This management makes it possible to execute the following of vehicles with ease.

Figure 25:
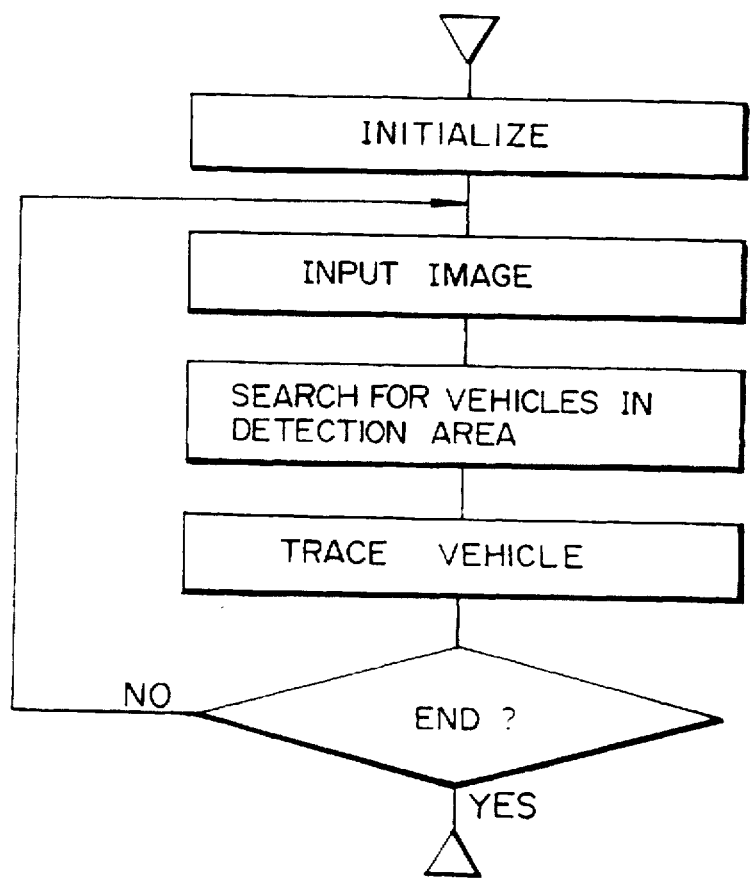
FIG. 25 is a diagram showing an example of main flow in following a moving object.
Figure 26:
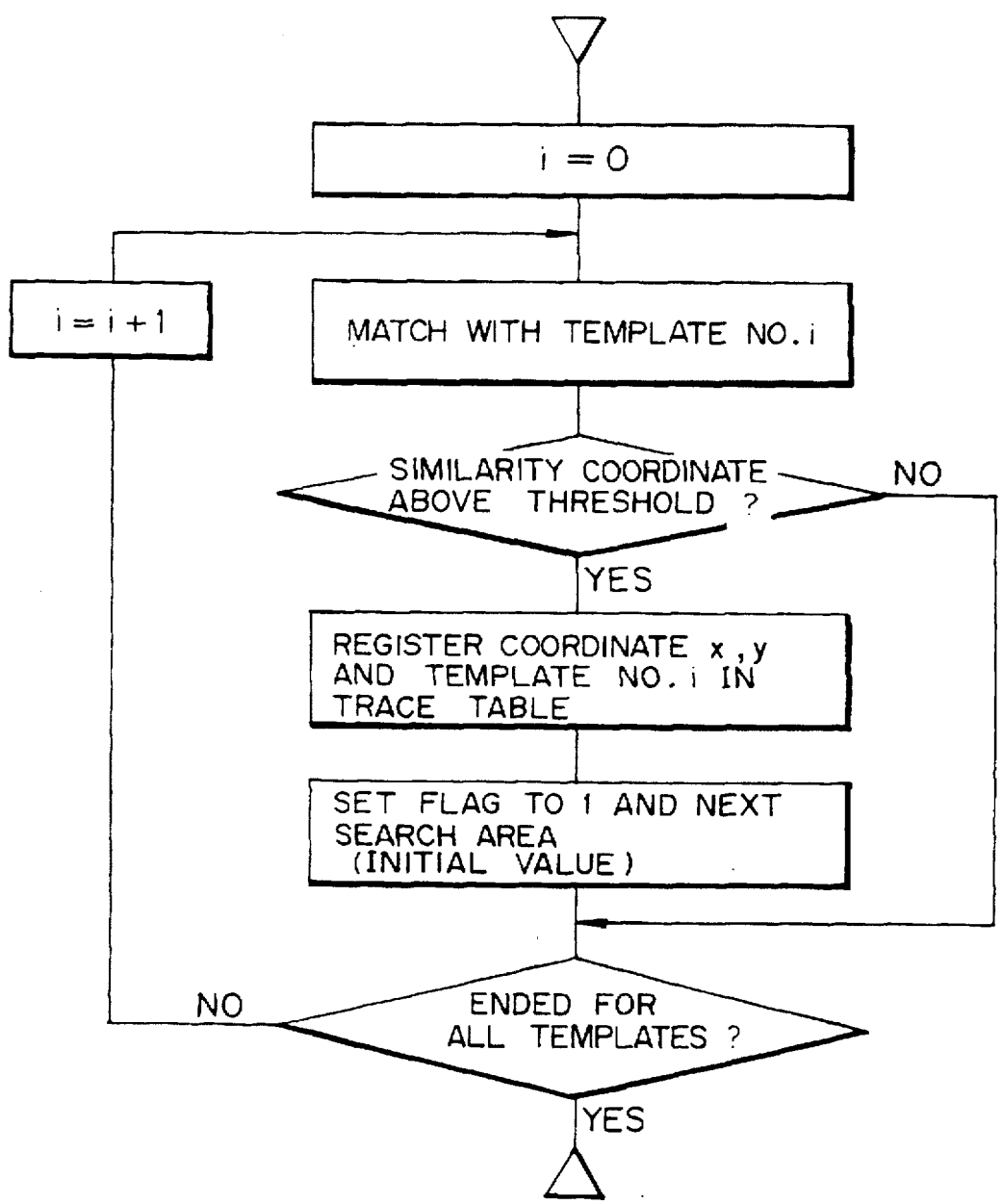
FIG. 26 is a diagram showing an example of the flow of vehicle search processing in a detection area with a moving vehicle followed.
Figure 27:
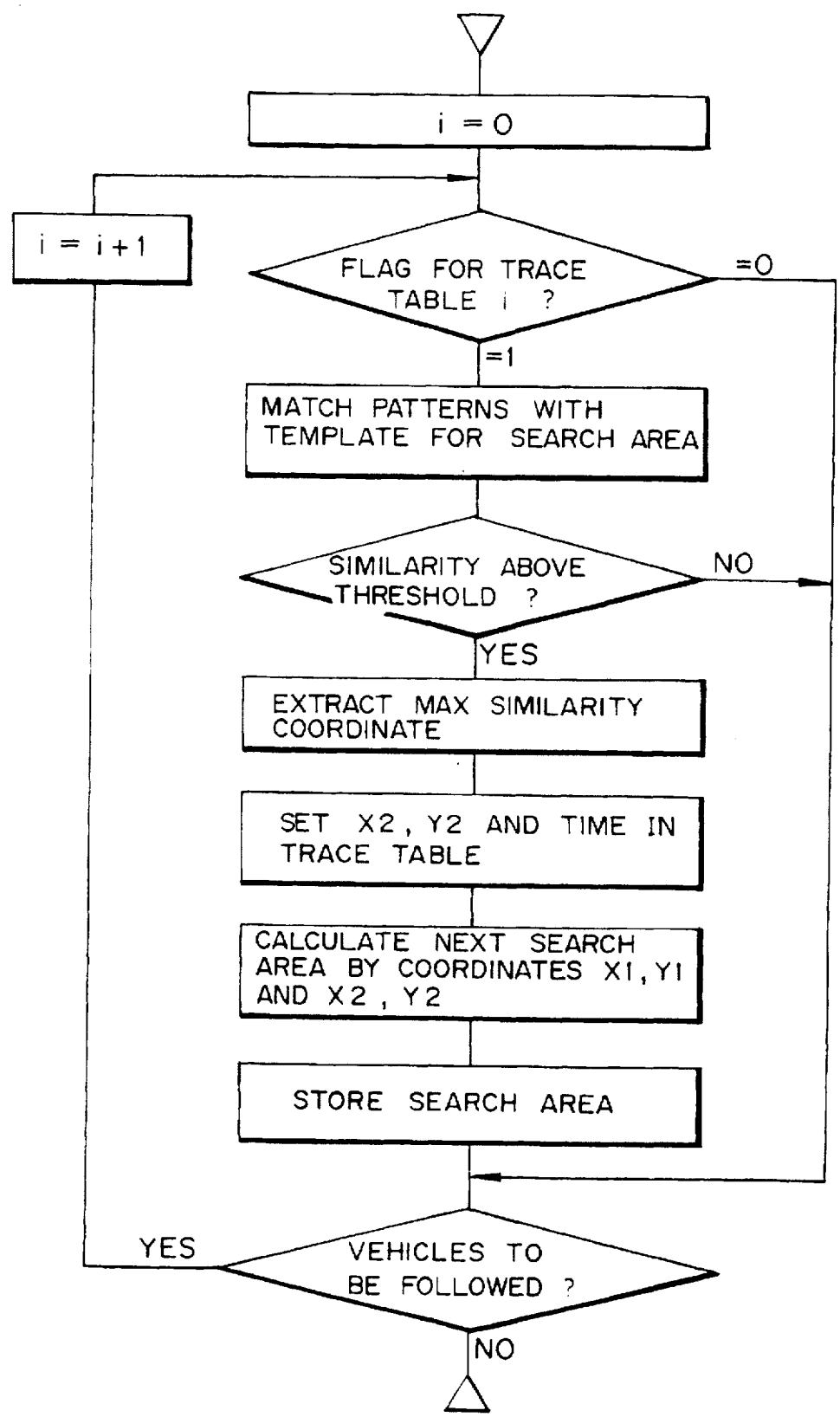
FIG. 27 is a diagram showing an example of the flow of following a vehicle as a moving object.

FIGS. 25, 26 and 27 are flowcharts showing specific steps of processing, in which FIG. 25 shows a main flow.
(1) First, shade templates are registered and the management table is initialized.
(2) An image is inputted, and vehicles are searched for in a detection area with respect to the particular image, thereby executing the following of vehicles.

The vehicle search in the detection area is executed as follows, as shown in FIG. 26:
(1) The shade template number is initialized, and the matching processing executed by the template number i.
(2) If there is any coordinate with a similarity degree more than a threshold value, the maximum coordinate for such a similarity degree is determined, and the coordinate, the shade template number and the time are registered as Xol, Yold, Tno and Timeold respectively in the following (tracking) table.

TABLE 2

Conditions at time t1

| flag | Xold | Yold | Tno | Timeold | x1 | Y1 | Time1 | X2 | Y2 | Time2 | Next search area |
|------|------|------|-----|---------|-----|-----|-------|-----|-----|-------|------------------|
| 1 | x0 | y0 | 3 | t | x0 | y0 | t | x1 | y1 | t1 | xs', ys', xe', ye' |
| 1 | x1 | y10 | 5 | t | x10 | y10 | t | x11 | y11 | t1 | |
| . | | | | | | | | | | | |
| . | | | | | | | | | | | |

Similar processing is executed also for the vehicle at point P2. In the second and subsequent executions, the moving speed can be determined. The moving speed V thus determined and the direction θ are used to determine and store the next search area by the method mentioned above. This is also the case with the processing at time point t2, which is expressed as in Table 3.

(3) In the process, values of Xold, Yold and Timeold are stored in X1, Y1 and Time1, respectively.
(4) Then, a flag of the table is set and the next search area (initial value) is determined.

The above-mentioned processing is executed also for all the shade templates. The vehicle detection process is thus complete.

TABLE 3

Conditions at time t2

| flag | Xold | Yold | Tno | Timeold | x1 | Y1 | Time1 | X2 | Y2 | Time2 | Next search area |
|------|------|------|-----|---------|-----|-----|-------|-----|-----|-------|------------------|
| 1 | x0 | y0 | 3 | t | x1 | y1 | t1 | x2 | y2 | t2 | xs', ys', xe', ye' |
| 1 | x1 | y10 | 5 | t | x11 | y11 | t1 | x12 | y12 | t2 | |
| . | | | | | | | | | | | |
| . | | | | | | | | | | | |

The processing for following vehicles is executed as shown in FIG. 27.

(1) The counter of the following table is initialized. The pattern matching is effected by the shade template (Tno) with respect to the next table if the flag in the following table i is "0", and with respect to the search area if the flag is "1".

(2) If there is any similarity degree more than a threshold value, the coordinate of maximum similarity degree is extracted. The coordinate is stored at X2, Y2 of the following table, the prevailing time at Time2.

(3) A search area for the next image is calculated from the moving speed and direction determined from X1, Y1, X2, Y2, and the search area is stored.

(4) After that, X2, Y2 and Time2 are copied at X1, Y1 and Time1 respectively.

The afore-mentioned operation is performed for all the vehicles with a set flag, thereby completing the vehicle-following processing.

Provision of a number of shade templates for detection of incoming vehicles would consume a very long time in vehicle search at a detection area in FIGS. 24A to 24D, with the result that moving objects, if high in speed, could not be detected one by one. This problem may be solved by either of the two countermeasures described below.

(1) To reduce the shade templates as far as possible.

(2) To prepare shade templates for following vehicles from an input image.

The method (1) will be explained. Shade templates of only "white/small", "black/small", "white/large" and "black/large" used for vehicles are insufficient in number. In the case where a white/small template is available, for instance, the vehicles, though all small in size, cannot be detected by the matching with patterns of different shapes due to variations including sedan, van, jeep and vehicle with loading space. It is, however, very time-consuming and unrealistic to store all types of shade templates for matching.

Figure 28:
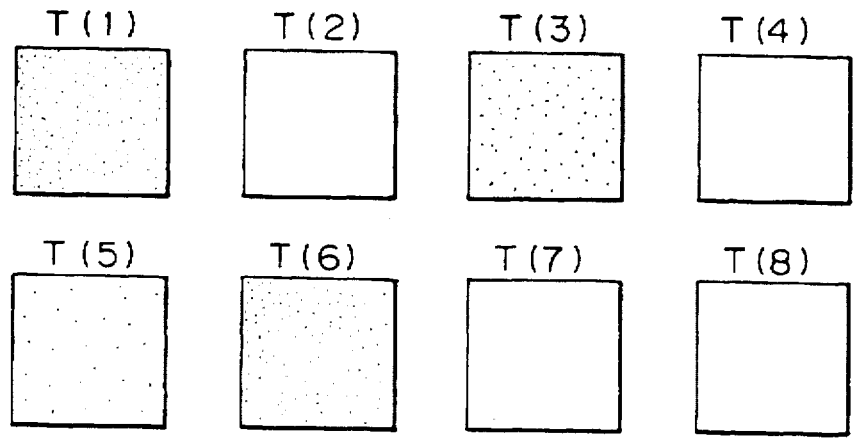
FIG. 28 is a diagram showing an example of processing for minimizing the number of templates.

In view of this, a method of preparing shade templates will be explained with reference to FIGS. 28 to 30. Assume that there are eight shade templates T(1) to T(8) prepared as shown in FIG. 28. The similarity degree of each template in comparison with the others is checked by matching, say, template T(1) with the other shade templates. If there is any pair of similar templates, both the templates of the particular pair are used to prepare a new pattern of template, while the original one is discarded thereby to reduce the number of templates. In the case where pattern T(1) is similar to pattern T(6), and pattern T(3) to pattern T(5), for example, the images of both patterns T(1) and T(6) are averaged to prepare a pattern T'(1). Also, a pattern T'(3) is prepared by averaging the images of patterns T(3) and T(5).

Figure 29:
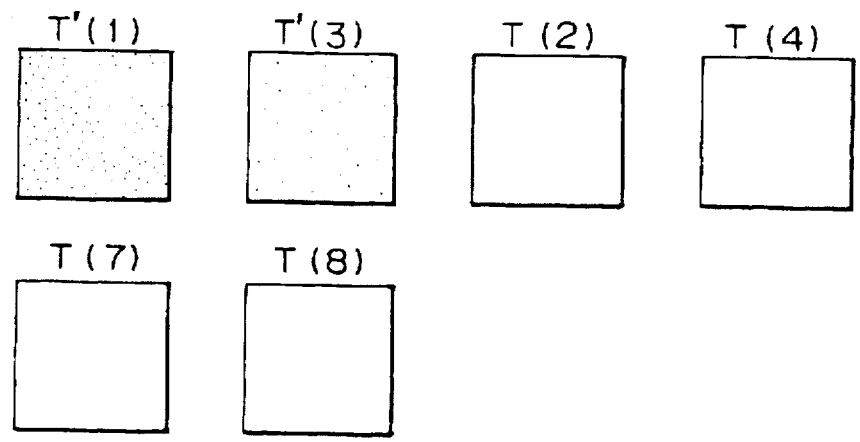
FIG. 29 is a diagram showing another example of processing for minimizing the number of templates.
Figure 30:
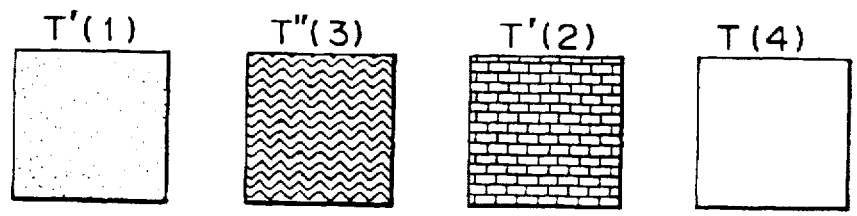
FIG. 30 is a diagram showing the processing for minimizing the number of templates.

As a result of combining images by determining the similarity once in the manner mentioned above, the shade templates are reduced to six as shown in FIG. 29. By similar matching between the patterns shown in FIG. 29 and the initial shade templates T(1) to T(8) shown in FIG. 28, new shade templates shown in FIG. 30 are synthesized, thereby reducing the total number of templates. If this process is repeated until the similarity degree larger than a certain threshold value is eliminated, the shade templates finally obtained meets the necessary minimum for extracting vehicles. The processing time is thus remarkably reduced. Instead of preparing a new shade template by averaging images as mentioned above, the maximum or minimum concentration of two images may be reserved.

Now, the method (2) will be explained. According to the method (2), shade templates are not prepared in advance. Instead, images to be followed are automatically cut out of an input image taken by way of TV camera, and are used as shade templates. In this case, as many templates as vehicles to be followed suffices.

Figure 31:
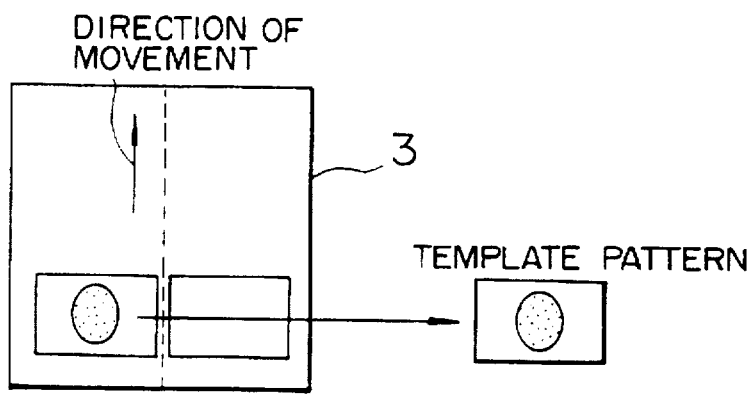
FIG. 31 is a diagram showing an example of preparation of an initial template image of a vehicle.
Figure 32:
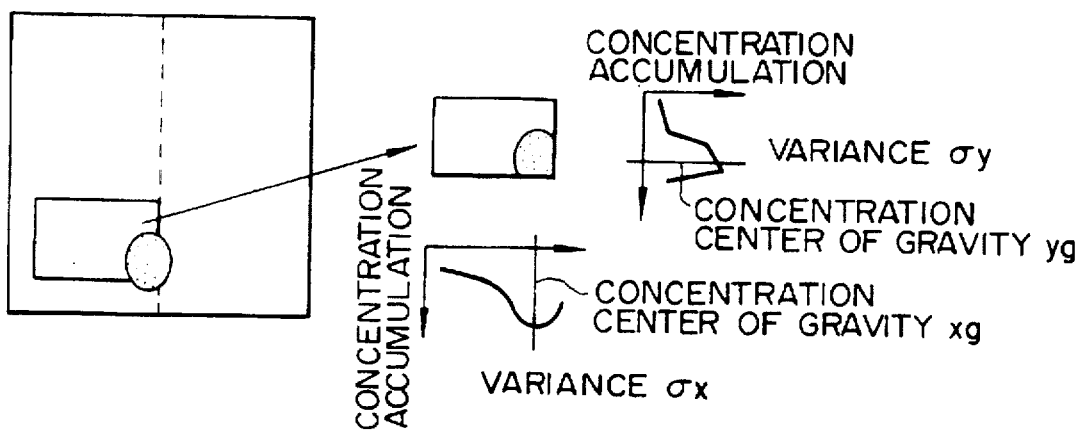
FIG. 32 is a diagram showing the condition of a vehicle displaced from an extracted area.

This method will be explained with reference to FIGS. 31 to 33. FIG. 31 shows a case in which a vehicle is moving upward in the screen (the dashed line defines lane areas). In order to follow this vehicle, an area sufficient covering the vehicle is cut out of the image at the lower part of the screen, and is used as a shade template as shown in FIG. 31. If an image not covering the vehicle at the center of the area to be cut out is registered as a shade template as shown FIG. 32, the subsequent following process is adversely affected. The concentration of the image thus cut out is checked for any deviation to periphery, and if need be, the position and size of the area to be cut out are changed.

Taking note of the fact that the vehicle pattern is laterally symmetric, the processing mentioned below is executed.

(1) The cumulative distribution of concentration along vertical direction of the cut-out image is determined (cumulative distribution of concentration along abscissa).

(2) The center of gravity xg and the variance σx of the concentration of the distribution thus obtained is determined.

(3) In similar fashion, the cumulative distribution of concentration is determined along horizontal direction of the image cut out (cumulative distribution of concentration along ordinate).

(4) The center of gravity yg and the variance σy of concentration of the distribution thus obtained are determined.

Figure 33:
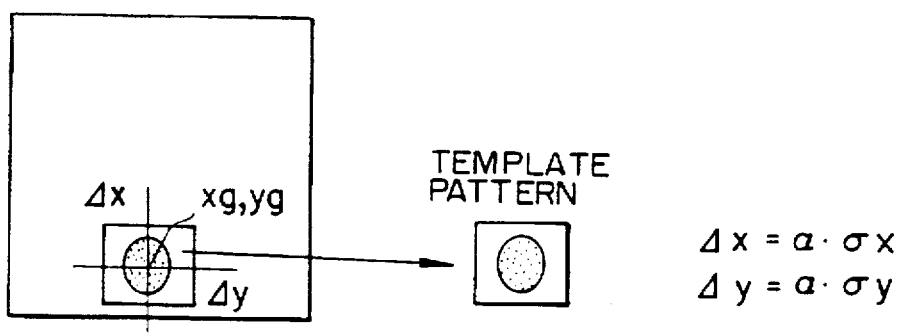
FIG. 33 is a diagram for explaining a vehicle set at the center of an extracted area.

(5) With the concentration center of gravity xg, yg as a central coordinate, an area of the size given as $$\Delta x = \alpha \cdot \sigma x$$

$$\Delta y = \alpha \cdot \sigma y$$

is cut out, where α is a constant (FIG. 33).

(6) The processing mentioned above is executed again for the cut-out area and is repeated until the center-of-gravity coordinate and variance come to remain unchanged.

Figure 34:
FIG. 34 is a diagram for explaining the manner in which the size of a template image is determined in accordance with the vehicle size.

The aforementioned processing makes it possible to register a shade template of a minimum area (FIG. 34) surrounding a vehicle. In the case where the concentration is sided in the end, the vehicle is assumed to be not covered completely in the screen, and the registration of the shade template is suspended (and reprocessed with an image inputted at the next time point).

Figure 35A:
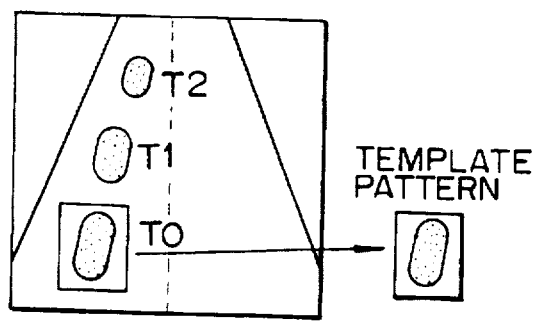
FIGS. 35A and 35B are illustrations showing a method of updating a template with the vehicle size changing.

The embodiments described above refer to the processing with a road viewed from right above. In actually taking a picture of a road, however, it is virtually impossible to photograph a road from right above. The inevitable result is taking a bird's-eye view of a road. In such a case, the road presents such a view that a vehicle, with the movement from T1 to T2 starting with time T0, appears the smaller the farther it runs away, as shown in FIG. 35A. If a shade template is followed in the manner explained with reference to FIG. 31, a vehicle appearing to be of the same size as the shade template could be detected but a far vehicle could not be detected and finally fails to be followed.

Figure 35B:
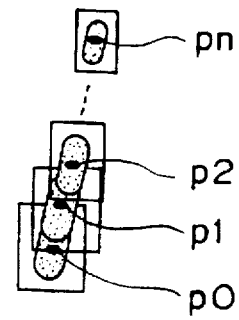

This inconvenience is overcome by updating the shade template while following the vehicle as shown in FIG. 35B. More specifically, when a point P0 is detected by a shade template, another shade template for the next search is prepared by use of an image proximate to the point P0. In this method, as in the method described above, the concentration center of gravity and variance may be used. The shade template thus newly registered is used for matching processing for the next search area thereby to determine the point P1. A shade template is prepared by using an image in the vicinity of the point P1. This process is sequentially executed, so that vehicles, even if changed in size, can be followed in versatile fashion. This method is based on the fact that the vehicle size rarely changes instantaneously.

A template may alternatively be prepared by linear coupling operation ($\alpha f+\beta g$, $\alpha+\beta=1$) or by determining an average (($f+g$)/2) of the image (f) in the vicinity of a newly-detected vehicle position and the preceding template image (g).

If this technique is used, a vehicle can be followed easily by updating the shade template at the same time, unlike when using a single template in which case the following of a vehicle is suspended midway in measuring the number of vehicles turning to the right at an intersection, in view of the fact that the vehicle turning to the right changes its direction slowly, as shown in FIG. 12. An alternative method consists in reducing the size of the shade template according to the vehicle size, i.e., according to the ratio determined by the ordinate of the vehicle position determined. In this method, however, the change only in size can be dealt with.

According to the present embodiment, as described above, the behaviour of vehicles, even if low in contrast or superposed, can be detected accurately by the shade pattern matching. Also, the updating of a shade template makes it possible to execute the following of a moving object by pattern matching even when the shape of the template stored or the moving object undergoes a change. Especially, easy recognition of a vehicle turning to the right at an intersection or the like is possible.

This embodiment is also applicable to the detection of a stationary vehicle (such as illegally parked) or management of a parking lot (detection of an occupied section).

Another embodiment of the present invention as applied to an abnormality detection system for a road, etc. will be explained.

Figure 36:
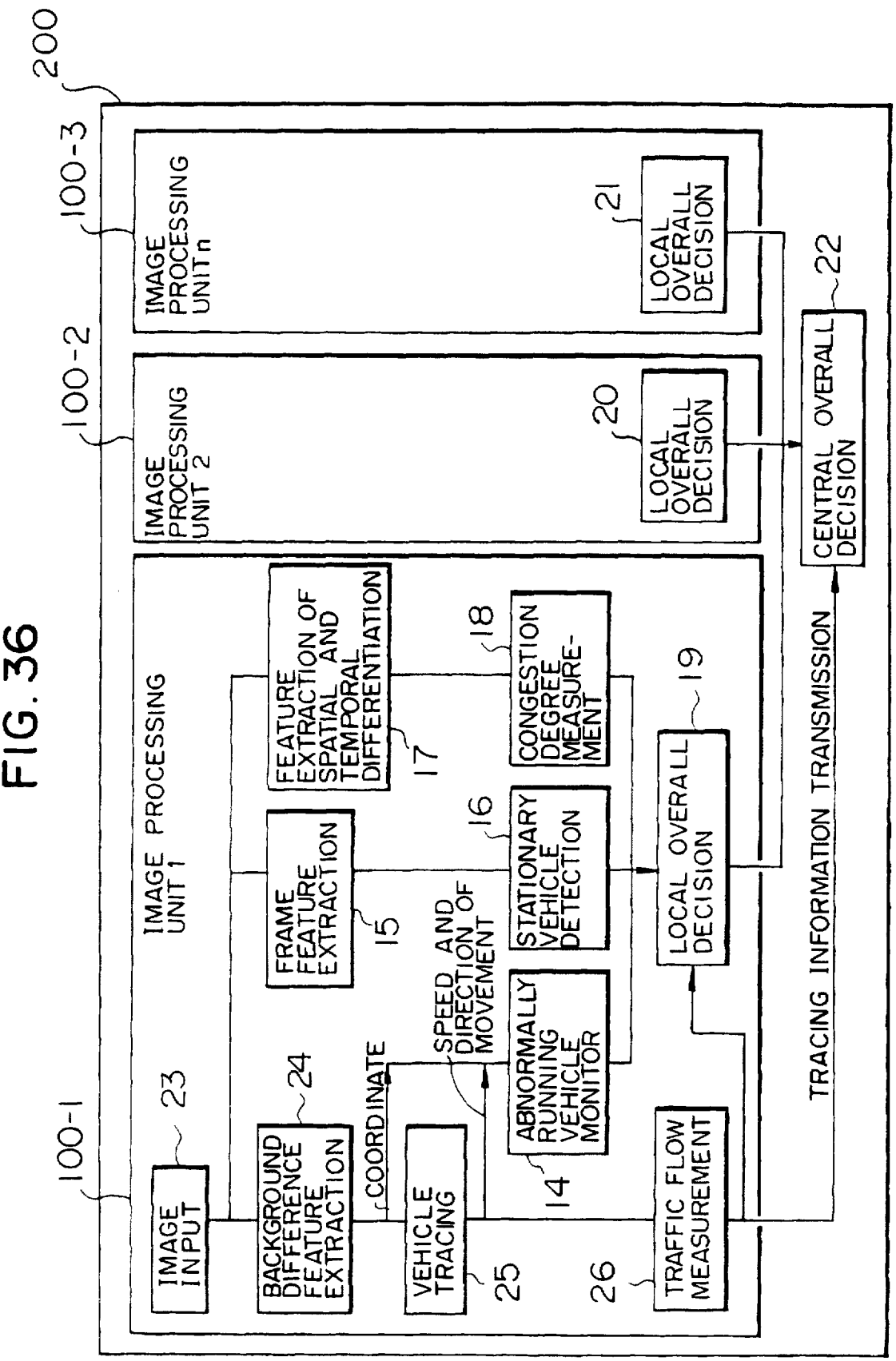
FIG. 36 is a block diagram showing the configuration of an abnormality detection system according to an embodiment of the present invention.

A general configuration of the present embodiment is shown in FIG. 36. An abnormality detection system 200 includes a plurality of image processing units 100-1, 100-2 and 100-3 and a central overall determination section 22. In order to grasp various abnormal phenomena, each of image processing units 100-1, 100-2 and 100-3 includes a traffic flow measuring section 26 for collecting various information by processing input images of objects, an abnormal run monitor 14, a stationary vehicle detector 16, a congestion degree measuring section 18 and a local overall determination section 19 (19-1, 19-2, 19-3). The central overall determination section 22, on the other hand, is for collecting data on each image processing unit and making an overall determination by spatial interpolation, for example.

The operation of each section will be briefly explained. The image processing unit 100 is inputted with an image (section 23), extracts a background difference feature with respect to the image (section 24), follows vehicles (section 25), and measures the resulting traffic flow (number and speed of vehicles) (section 26). Also, the frame feature of an input image is extracted (section 15) and a stationary vehicle is detected (section 16). In addition, features of spatial and temporal differentiations with respect to an input image are extracted (section 17) and the degree of congestion is measured (section 18). An overall decision is made on these results at the local overall determination section 19 (20, 21) to determine the presence or absence of any abnormal phenomenon. At the same time as the abnormality determination at each unit, all the measurement information such as congestion degree and speed obtained at each unit are collected by the central overall determination section 22, and after spatial interpolation, an abnormal phenomenon outside of the visual field of the camera is detected.

Each section will be described below in detail.

(1) Traffic Flow Measurement Section

Figure 37:
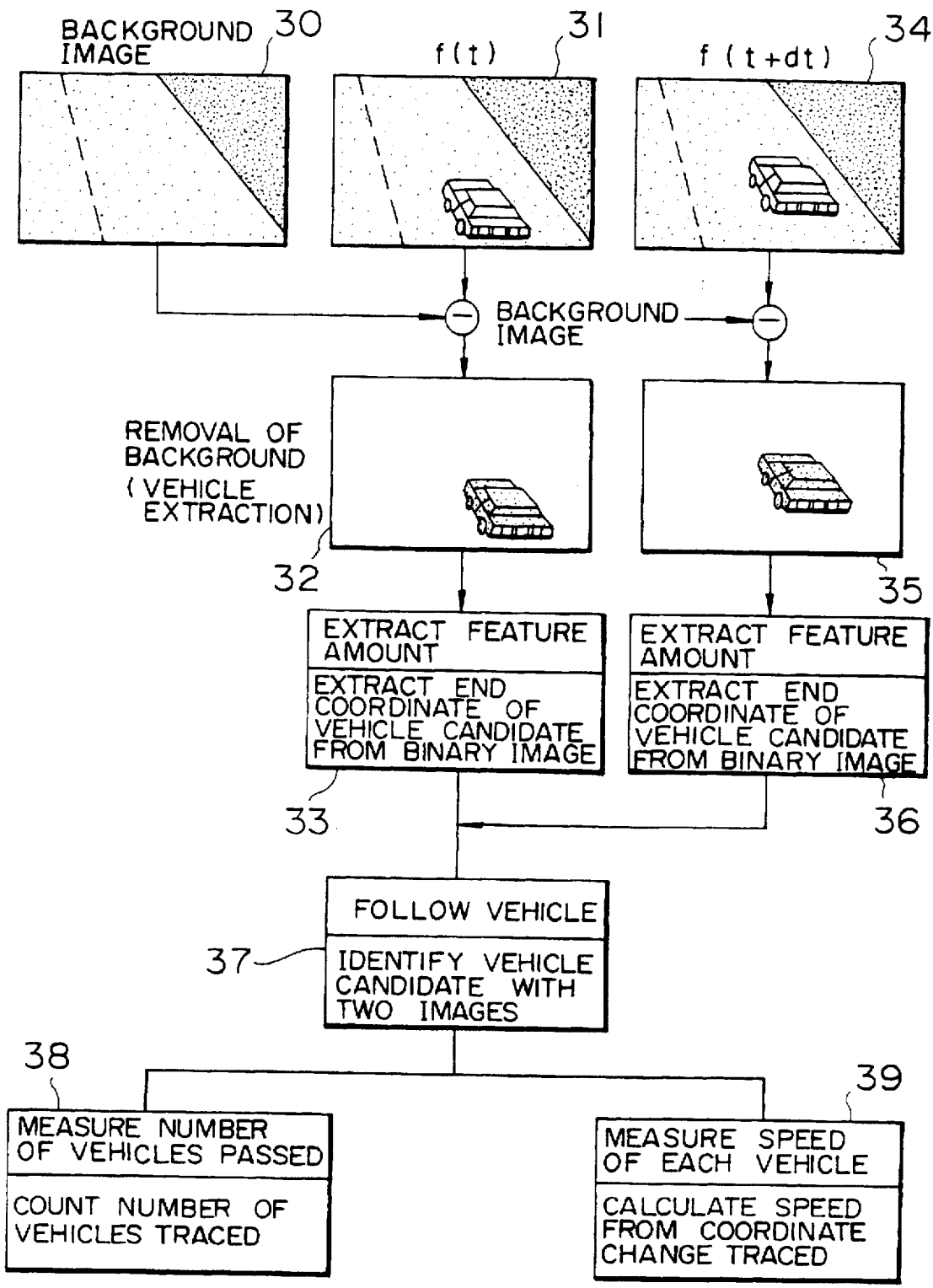
FIG. 37 is a flowchart for explaining the outline of processing of traffic flow measurement.

The traffic flow measurement data includes the vehicle speed and the number of vehicles passed. An example of the method for obtaining these data is shown in FIG. 37. The steps for processing are described below.

The background image 30 stored in advance is removed from the input image f(t) 31 at time point t thereby to extract a vehicle.

The end coordinate of the vehicle image 32 extracted (as in the case where the vehicle is photographed from behind) is detected (33).

The above-mentioned steps 35 and 36 are executed with the image f(t+dt) sequentially obtained, and the position to which the end coordinate has moved is determined by the coordinate-following operation 37.

The number of vehicles passed 38 and the speed 39 are measured from the coordinate change followed.

The vehicle flow within the visual field of the camera can be measured by this processing. It is possible to determine by monitoring this data that an abnormality has occurred, for example, when the vehicle speed has abnormally decreased.

When the end coordinate of a vehicle is extracted, the range of vehicle existence, i.e., the coordinates at the extreme right and left ends of the vehicle are measured at the same time in order to monitor for an abnormal run as described below.

(2) Abnormal Run Monitor Section

A small fallen object or the like cannot be easily detected by the function of stationary vehicle detection described below. In the presence of a fallen object, however, the vehicle is normally driven avoiding the object, and therefore an abnormal running pattern is generated. This function is for monitoring such an abnormal running pattern. Many vehicles running in abnormal manner are liable to straddle the lane boundary, frequently change lanes or change the speed suddenly.

Figure 38:
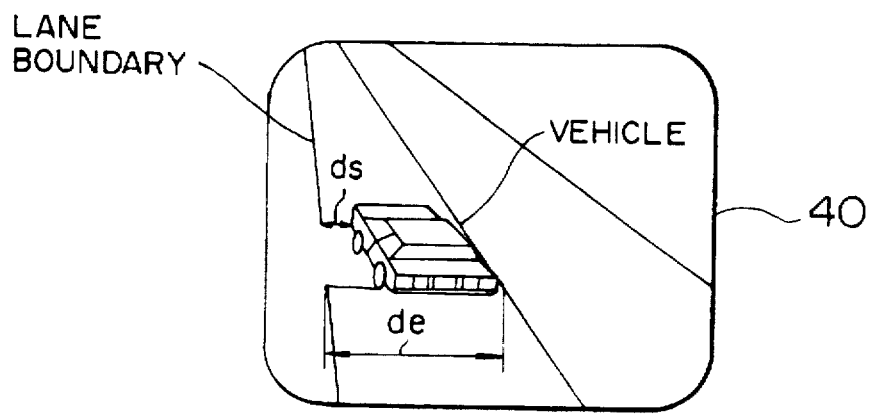
FIG. 38 is a diagram for explaining the outline of processing of monitoring abnormally-running vehicles.

In order to detect such phenomena as mentioned above, the present invention uses the processing as shown in FIG. 38. A road image is designated as 40.

A vehicle is extracted from an input image as in the traffic flow measurement.

The various coordinates of the vehicle are determined from the vehicle image extracted. They include the distance ds to the coordinate at the extreme left end of the vehicle, the distance de to the coordinate at the extreme right end of the vehicle and the central coordinate.

Each vehicle is followed at the time of traffic flow measurement, and the change of the coordinates thereof is determined. As a result, the instantaneous speed and direction of movement are obtained.

Figure 39A:
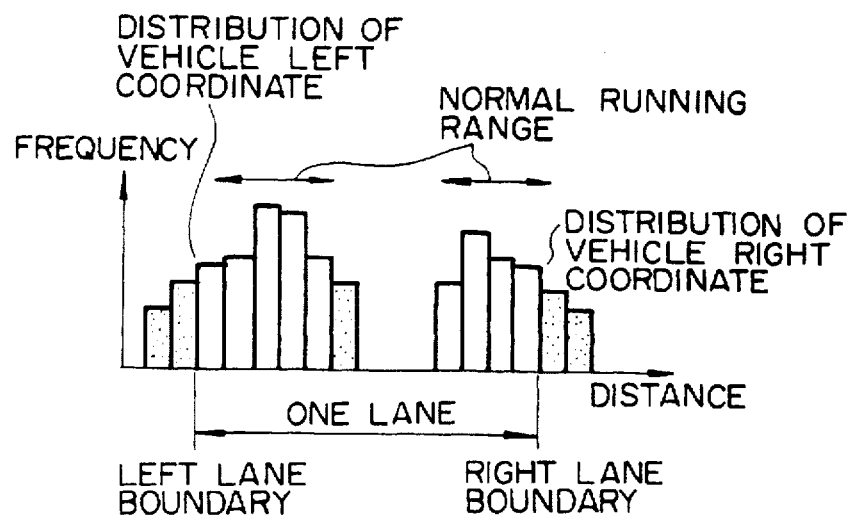
FIGS. 39A, 39B and 39C are diagrams for explaining an example of data accumulated as obtained for monitoring abnormally-running vehicles.
Figure 39B:
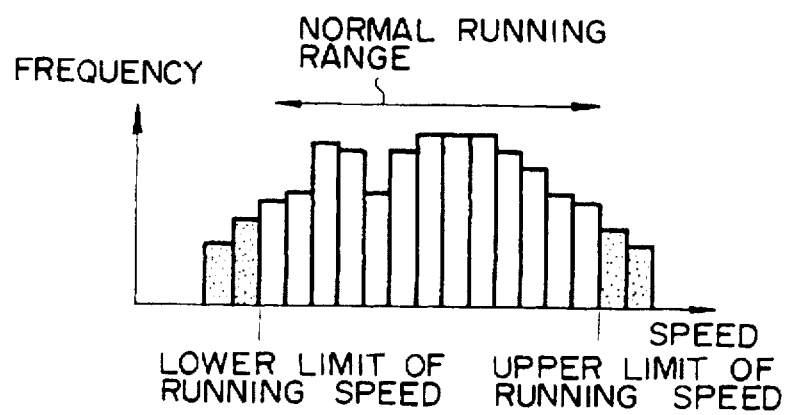
Figure 39C:
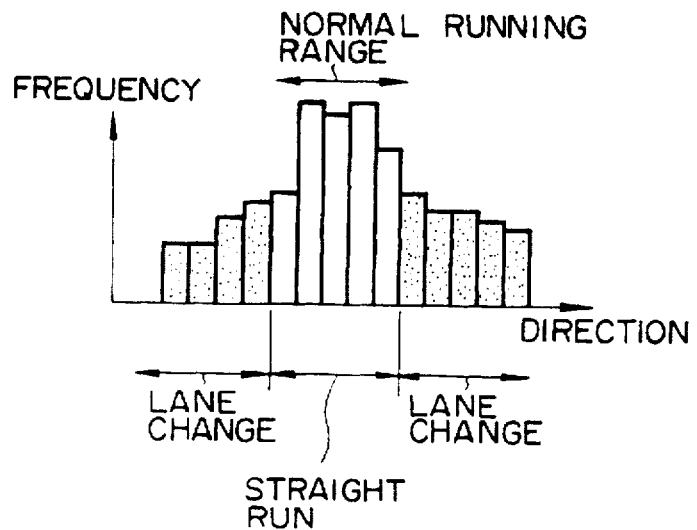

After the above-mentioned processings, the respective data are reserved as an accumulated data as shown in FIGS. 39A to 39C for abnormality determination.

Accumulated data on the coordinates at the extreme left and right ends provide information to determine a range in which vehicles are running frequently within a lane as shown in FIG. 39A. It is thus possible to determine that a vehicle is running abnormally when the frequency of displacement from a normal drive range exceeds a predetermined threshold value.

Determination can also be made on whether the data on speed or direction of movement, if managed in similar fashion as shown in FIGS. 39B and 39C, frequently assumes an abnormal value.

(3) Function of Stationary Vehicle Detection

In the case where there is any stationary vehicle present within the visual field of the camera, direct detection of the stationary object is more desirable than indirect measurement like the monitoring of an abnormal run. More specifically, a stationary object detectable by imaging (a stationary vehicle, a somewhat large fallen object, etc.) is detected directly.

Figure 40:
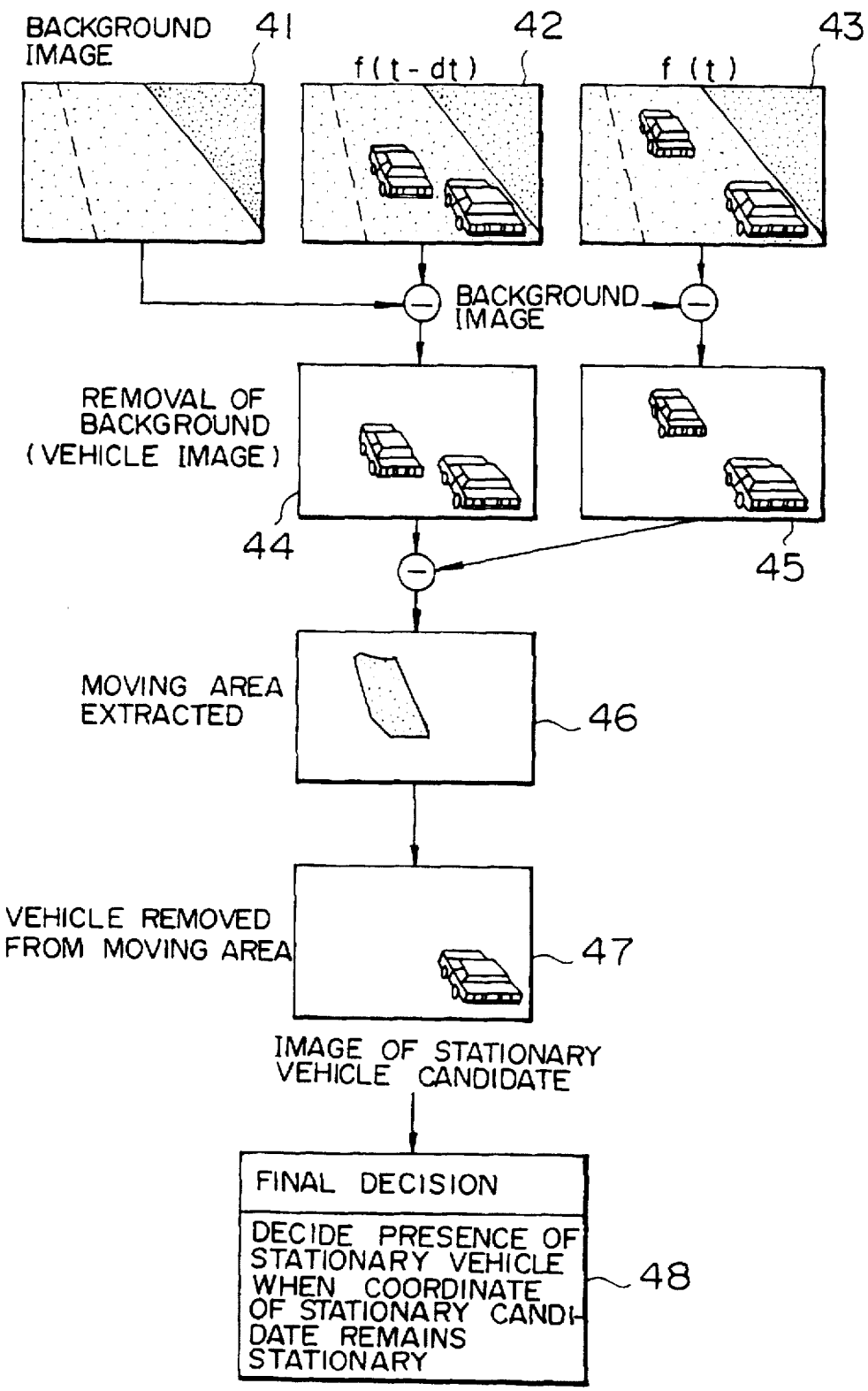
FIG. 40 is a flowchart for explaining the outline of processing of detecting a stationary vehicle.

A method of detecting a stationary object is shown in FIG. 40. An outline of this processing is described below.

An image is inputted at predetermined time intervals dt as indicated by f(t−dt) 42 and f(t) 43, and a background image 41 stored in advance is removed from each input image.

The images 44, 45 from which the background has been removed have only a vehicle image remaining therein. A moving object is detected by use of these images. A method of detecting a moving object is by determining the speed as in the measurement of traffic flow. In the case under consideration, however, a moving object is detected by the features between image frames. More specifically, two images are subjected to a differentiation processing to extract a moving area (46).

The area from which a moving area image 46 is removed from an image lacking the background makes up a candidate image of a stationary object (47). Upon confirmation that the position of this object remains stationary, it is determined that there exists a stationary object as a final result (48).

A stationary object or a fallen object can be detected within the visual field of the camera by executing the above-mentioned processing.

(4) Function of Congestion Measurement

An abnormal phenomenon outside of the visual field of the TV camera is impossible to detect directly. In view of this, a phenomenon as a repercussion of an abnormality occurring outside of the camera which enters the visual field thereof, i.e., the congestion degree, is measured. In the case where the congestion degree assumes a value different from a normal one, it may be decided that some abnormality has occurred in the direction forward of the vehicle.

Figure 41:
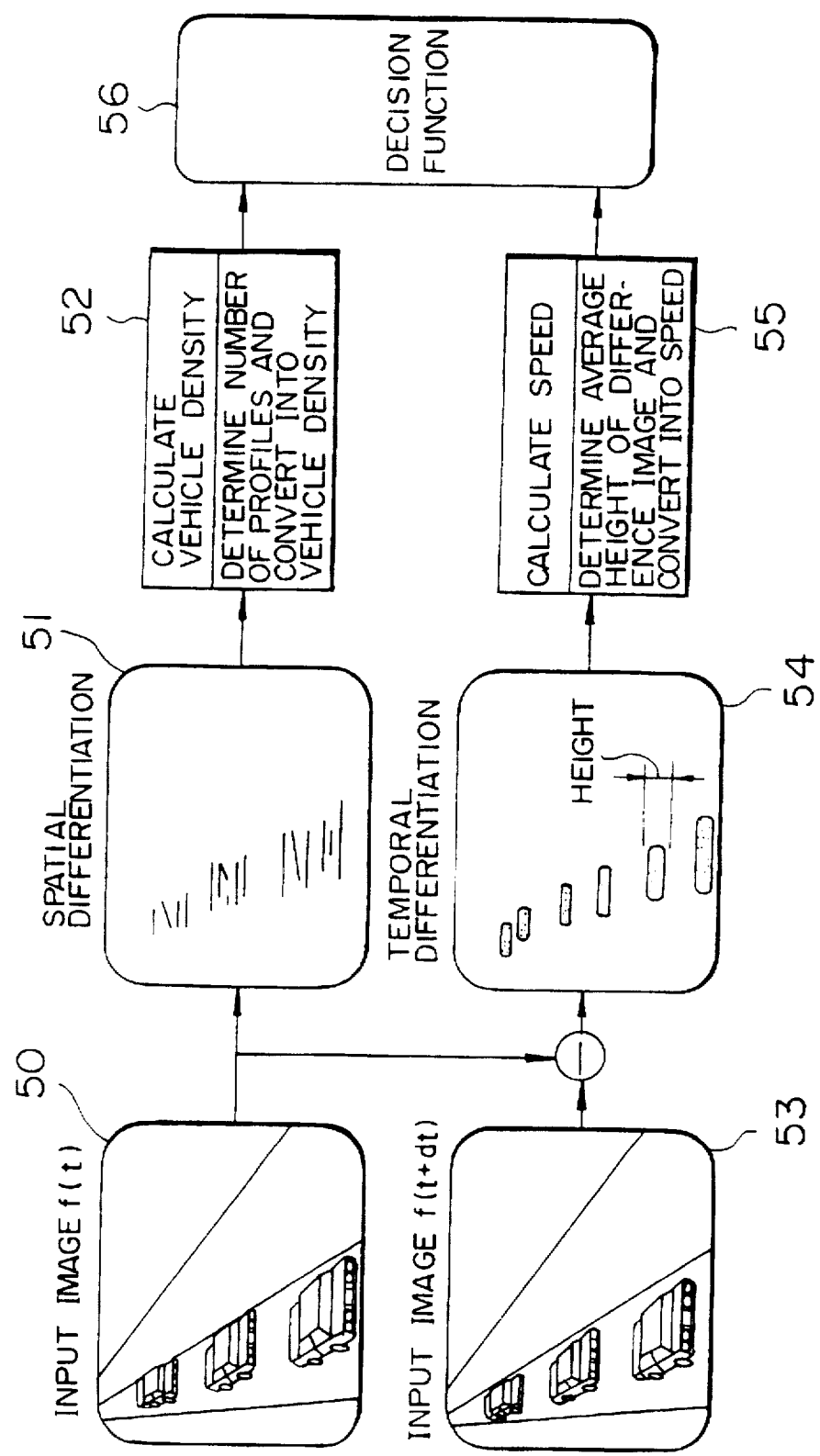
FIG. 41 is a diagram for explaining the outline of processing of congestion degree measurement.

The congestion (traffic jam) degree may be measured by various methods. The method employed in the present invention uses no traffic flow data but is based on the macroscopic measurement of the number and speed of vehicles taken by such expressions as "vehicles are many", "vehicles are few", "vehicle speed is high" or "vehicle speed is low" as shown in FIG. 41. This is due to the fact that with the intensification of vehicle congestion, the images taken by the TV camera are superposed one on another, thereby making impossible the microscopic measurement of the number and speed of vehicles. Especially, vehicles appear superposed very often in a tunnel where TV cameras are installed at low level.

The processing will be described briefly below.

An input image f(t) 50 is differentiated (with a profile perpendicular to the running direction extracted) (spatial differentiation 51), and the feature amount relating to the vehicle quantity is calculated (52). In the case under consideration, a differentiated image is binary-coded and the number of vehicle profiles is determined.

Further, an image f(t+dt) 53 is inputted at predetermined time intervals dt (say, 200 ms), and a difference image is determined for each picture element of f(t) 50 and f(t+dt) 53 (temporal differentiation 54). If a vehicle is moving, a differentiation image in some form or other appears. In the case where the vehicle remains stationary, on the other hand, no information is obtained. The feature amount (such as width) of an image obtained from the differentiation image is therefore determined as a data relating to speed (55).

The feature amounts relating to the vehicle quantity and speed mentioned above are applied to a decision function 56 engaged in learning in advance for calculation of the congestion degree. A neural network is used for the decision function under consideration.

An abnormal phenomenon can be monitored by the feature amount like the vehicle quantity or speed as well as by the congestion degree determined from the above-mentioned processing.

(5) Local Overall Determination Section

The processing by the local overall determination section is executed mainly for improving the reliability of the information obtained from the functions of "traffic flow measurement", "measurement of abnormal run", "detection of stationary vehicles" and "congestion degree measurement". Abnormal phenomena include local ones such as stationary vehicles (accidents) and overspeed, and abnormalities covering wide areas like traffic congestion. An alarm should be issued against a local abnormality at the time point of detection by each image processing unit. Nevertheless, the problem of measurement accuracy makes it necessary to check the measurement result. Also, the manner in which an alarm is issued against a congestion apparently covering a wide range depends on whether the particular congestion is confined within the visual field of the camera or covers all the measurement points. As a result, information on an abnormality covering a wide range (congestion degree, measurement result of traffic flow, etc.) is sent to a host system to make an overall decision (determination).

The information applied to the local overall determination section includes:

Traffic flow: Speed is high or low, traffic volume large or small

Abnormal run: Frequent or infrequent overspeed, frequently or infrequently displaced from normal running course Stationary vehicle: Presence or absence Congestion degree: high, middle or low Of these information, local abnormalities relate to whether a case of overspeed or stationary vehicle is detected or not. As to the overspeed, a contradictory data indicating an overspeed at the time of congestion measured by the abnormal run function is considered impossible and is cancelled. The relationship between the measurement result of the congestion measurement function and the speed information is thus checked and a contradictory data is cancelled to prevent an overalarm. The information obtained in detecting a stationary vehicle, however, is reliable and may be used to issue an alarm immediately upon detection.

If the degree of an error developed by the speed data measured in accordance with the congestion level is grasped in advance, on the other hand, the speed data can be corrected in accordance with the congestion degree determined. This is also the case with the number of vehicles.

The local overall decision section checks for a data contradiction, and transmits information to a central determination section 22 as a host system, while at the same time controlling the information on the presence of a stationary vehicle or an abnormal run as determined under a condition allowing accurate speed measurement ("unbusy state") in such a manner as to permit an immediate alarm output.

(6) Central Overall Determination Section

In the event that TV cameras are installed at intervals of 200 m, for example, the range actually measurable by imaging covers only about one half of this distance. An abnormal phenomenon occurring at a position not monitored by imaging, therefore, is required to be subjected to interpolation (estimation) from the result of processing of adjacent TV cameras.

An interpolation processing described below is effected according to the present invention.

(i) Spatial Interpolation

Figure 42:
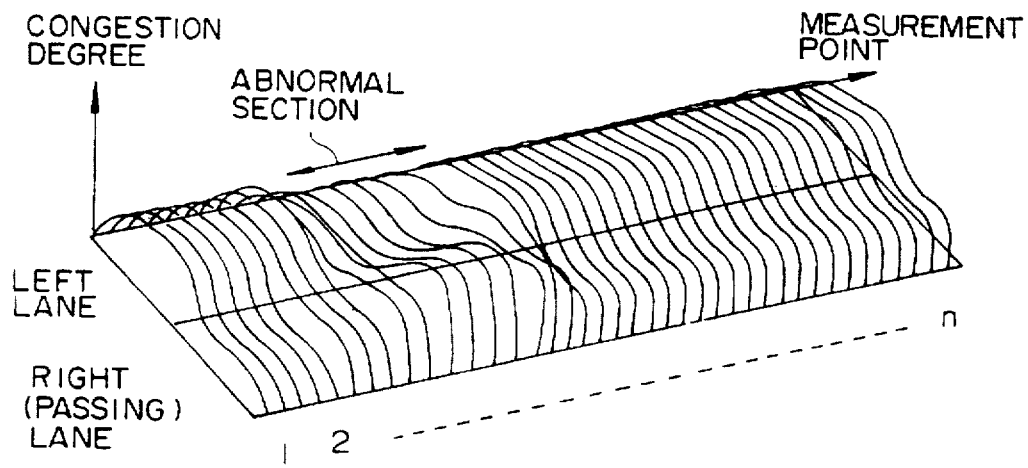
FIG. 42 is a diagram for explaining an example of the principle of spatial interpolation between cameras.

The spatial interpolation at the central overall determination section is to spatially grasp and interpolate the result of processing the image of each TV camera. The spatial interpolation enables a determination on whether a given congestion is a chronic one or due to an accident or a stationary vehicle, or an estimation of any abnormality in an area not covered by the camera. For example, the congestion degree at each ground point is plotted two-dimensionally as shown in FIG. 42, and it is decided that some abnormality has occurred at or in the vicinity of a point where the congestion degree has considerably changed as compared with the neighbouring conditions. In FIG. 42, the congestion degree of the left lane is low, while that of the opposite lane (passing lane) is high. It is, therefore, estimated that abnormally many vehicles change lanes in this section.

More specifically, the congestion degree obtained from each image processing unit is studied in overall fashion. It is decided that an abnormality is caused outside of the measurement section if traffic is congested in all sections, or that the congestion is a chronic one if the traffic congestion is limited to part of the measurement range, so that an abnormality decision is made only when traffic is congested only in part of the measurement range.

All the information acquired are processed as data, and any part where the congestion degree is locally different is searched for. If there is found any such part, an abnormality decision is made. Otherwise, a decision is made that the traffic is normal. The data is analyzed either by a general waveform (one-dimensional data on congestion degree with respect to ground point) analysis technique or by a method in which a waveform is directly inputted to a neural network to detect a change point.

Objects of data analysis may include not only the congestion degree but also the data on abnormally-running vehicles monitored (lane data, speed data, etc.). It is possible to make an abnormality decision when vehicles are displaced from a normal course only at a part of the range.

In general, an attendant observes the monitor screen to check for any abnormal phenomenon. If a spatial graph as shown in FIG. 42 is indicated to present the result of automatic decision to the monitor attendant, the conditions of the entire measurement range become easy to grasp.

An abnormality is an invisible phenomenon, and therefore the type thereof cannot be specified, although a decision as to the presence or absence of an abnormality is possible. The coordinate distribution, speed distribution, etc. of vehicles, instead of the congestion degree plotted in FIG. 42, may be spatially determined.

(ii) Temporal Interpolation

Figure 43:
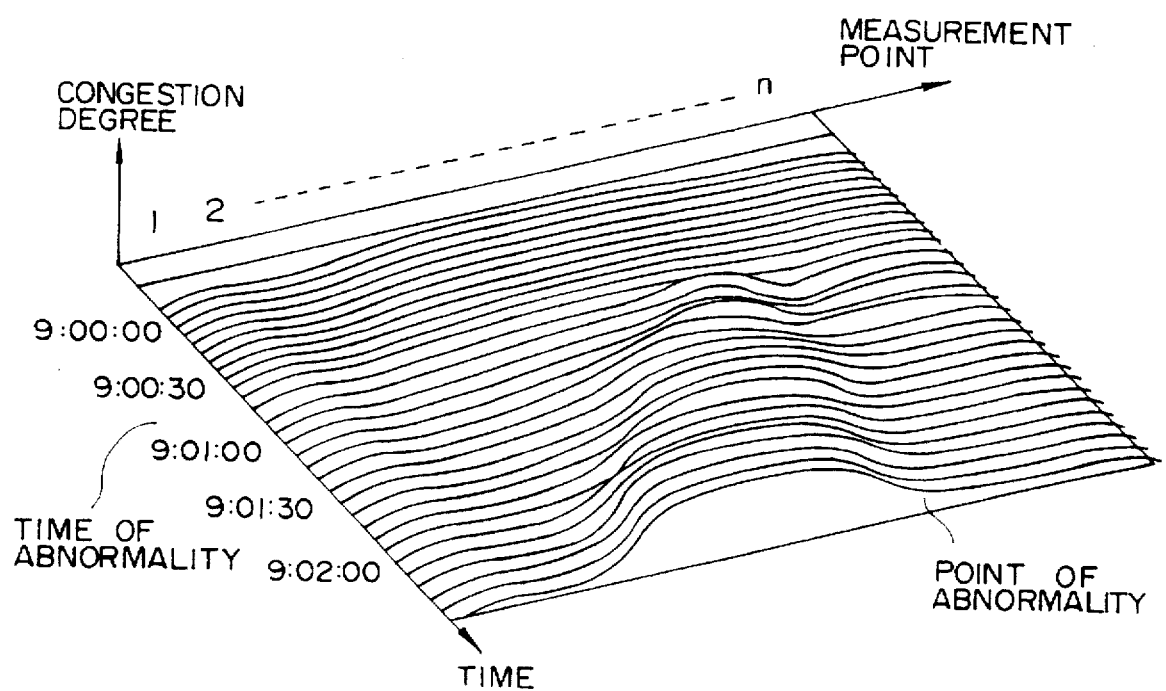
FIG. 43 is a diagram for explaining an example of the principle of time interpolation between cameras.

The data measured at each image processing unit is collected and managed in time series as shown in FIG. 43. A decision is made on the time of occurrence or on whether the abnormalities are of primary nature (such as the effect of a noise specific to the image processing) or of sustaining nature. This decision is made by waveform analysis as in the case of the spatial interpolation described above.

As a result, a noise-related abnormality is removed for an improved system reliability. Also, the indication to the monitor attendant facilitates the grasping of a chronological change as in the case of spatial interpolation.

Figure 44:
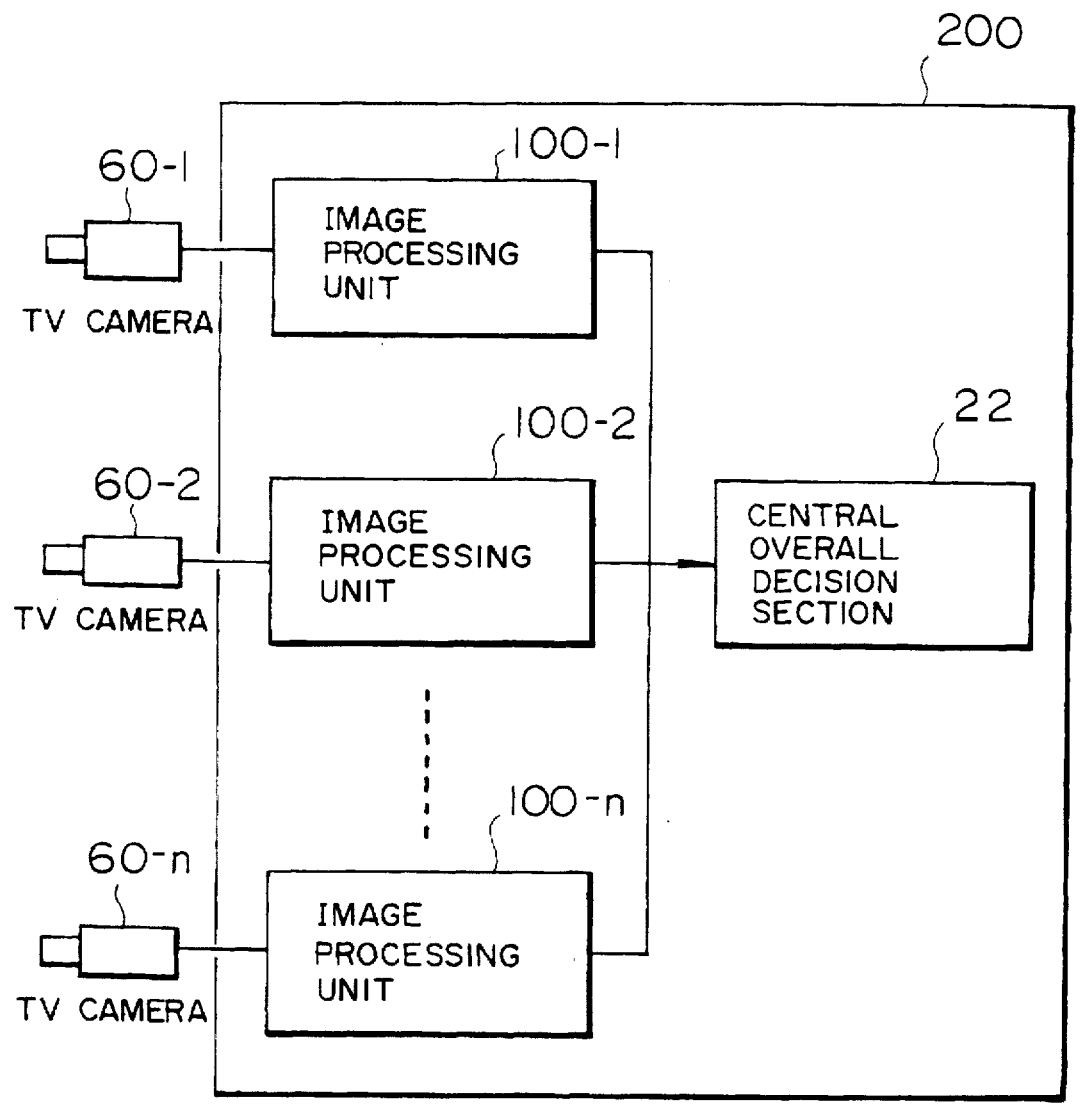
FIG. 44 is a block diagram showing an example of hardware configuration of an abnormal detection system according to the present invention.

An example of hardware configuration for realizing the abnormal phenomenon detection mentioned above is shown in FIG. 44. Video images from a plurality of TV cameras 60 installed appropriately are applied to image processing units 100, which execute "traffic flow measurement", "monitoring of abnormally-running vehicles", "detection of stationary vehicles" and "congestion degree measurement", and transmit the result of the executions to a central overall determination section 22 as a host system.

Figure 45:
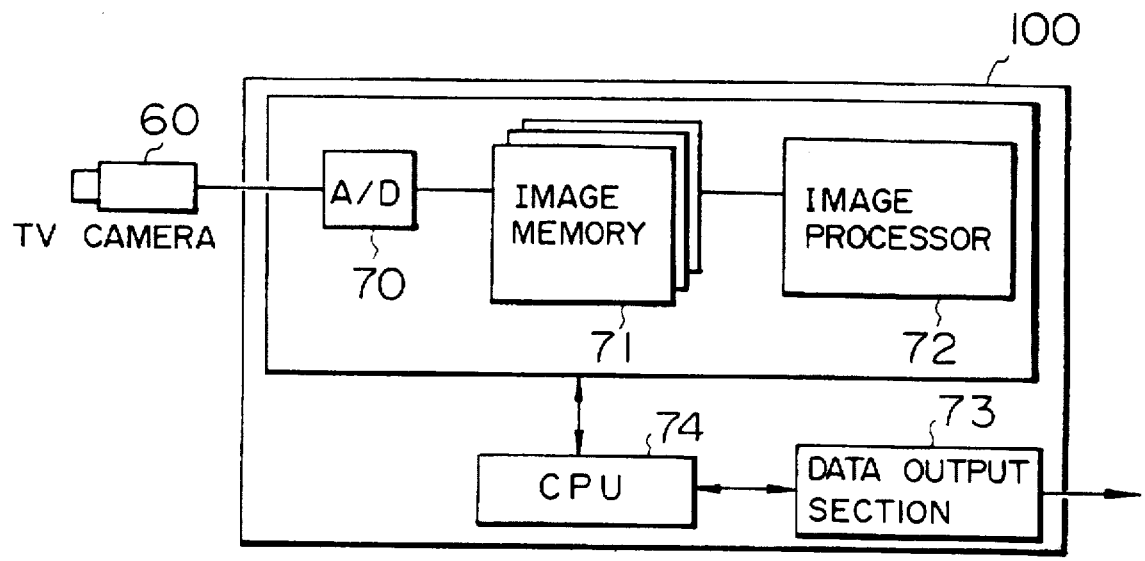
FIG. 45 is a block diagram showing a specific configuration of an image processing unit in FIG. 44.

Each of the image processing units 100 includes an A/D converter 70 for converting a video signal of the TV camera 60 into a digital signal, an image memory 71 for storing the resulting data, an image processor 72 for processing the data of the image memory 71, a data output section 73 for transmitting the data to the central overall determination section 22, and a CPU 74 for controlling these devices, as shown in FIG. 45. The image processor 72 is capable of executing the inter-image operations such as subtraction and addition of images or a spatial sum-of the products operation such as differentiation, binary coding or histogram processing. The local overall decision is processed at the CPU 74.

Figure 46:
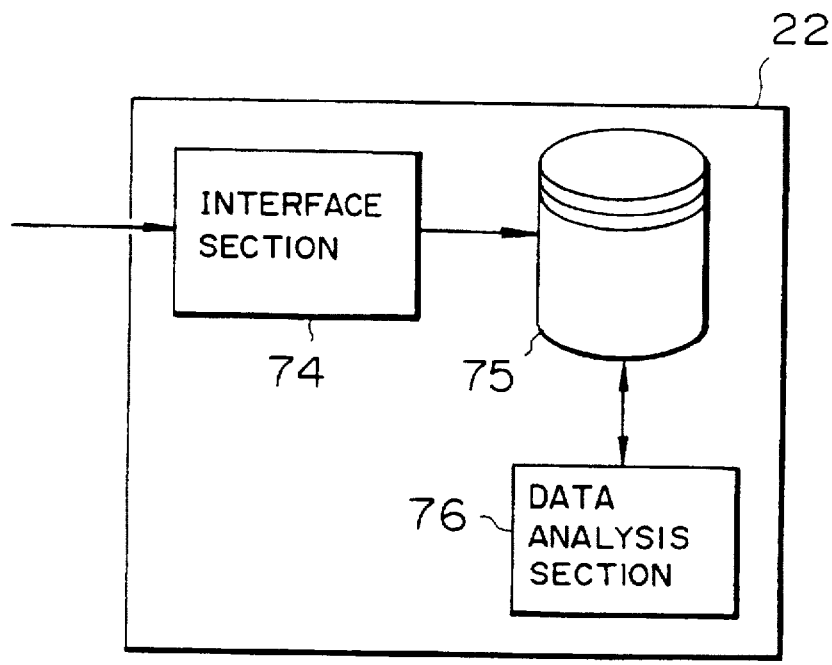
FIG. 46 is a block diagram showing a specific configuration of a central overall decision section in FIG. 44.

The central overall determination section 22, as shown in FIG. 46, includes an interface section 74 for transmitting and receiving a data with each image processing unit 100 not shown, a data accumulator 75 for reserving the data thus obtained, and a data analyzer 76 for subjecting the accumulated data to spatial and time interpolation.

According to the present embodiment, as described above, various abnormal phenomena are capable of being detected by the functions of "traffic flow measurement", "detection of abnormally-running vehicles", "detection of stationary vehicles", "congestion degree measurement" and "inter-camera interpolation".

In addition to the conditions in the tunnel, as described above, the road conditions in general can of course be monitored with equal effect according to the present invention.

We claim:

1. A vehicle recognition system for photographing a road by a TV camera and recognizing vehicle movement by processing images from the TV camera, comprising:

a template extracting circuit for extracting, as a template from an input image obtained by the TV camera an image pattern corresponding substantially to a moving vehicle whose movement is to be traced;

a template memory circuit for storing a template obtained with the template extracting circuit; and a pattern matching circuit for determining a vehicle position within a subsequent input image by pattern matching between the template corresponding substantially to the moving vehicle stored in the template memory circuit and said subsequent input image.

2. A vehicle recognition system as claimed in claim 1, further comprising:

a traffic parameter measurement section measuring a number and speed of vehicles passed by following vehicle positions obtained using said template.

3. A vehicle recognition system as claimed in claim 1, wherein said template more specifically corresponds only to the moving vehicle.

4. A traffic flow measurement system for photographing a road by a TV camera and recognizing vehicle movement by processing images from the TV camera, comprising:

a template memory circuit storing as a template, a vehicle image corresponding substantially to a moving vehicle whose movement is to be traced a pattern matching circuit pattern matching between the template corresponding substantially to the moving vehicle stored in the template memory circuit and a subsequent input image obtained from the TV camera; and a vehicle speed and direction determining means for determining a vehicle position by pattern matching with respect to the input image at a given time point, further determining the vehicle position with respect to the input image at a given time point and determining at least a speed and direction of movement of vehicles, in accordance with a change in coordinates of determined positions.

5. A traffic flow measurement system as claimed in claim 4, wherein said template more specifically corresponds only to the moving vehicle.

6. A pattern matching system for executing pattern matching between a continuously updated template and an input image, comprising:

a template memory circuit storing, as a template, a pattern of an image corresponding substantially to an object whose movement is to be traced;

a pattern matching circuit pattern matching between a template corresponding substantially to the object stored in the template memory circuit and a subsequent input image obtained from a TV camera; and a template updating circuit sequentially updating the templates of the template memory circuit using subsequent input images.

7. A pattern matching system as claimed in claim 6, wherein said template more specifically corresponds only to the object.

8. A method for recognizing movement of a moving object by photographing the moving object by an image pick-up means and processing images from the image pick-up means, comprising the steps of:

storing different portions of an image of a moving object in advance as several types of templates, each template corresponding substantially to the moving object; and matching patterns between the templates corresponding substantially to the moving object stored and a subsequent image obtained from the image pick-up means, and determining a position of the moving object within the subsequent image on a basis of at least one matching thereof.

9. A method as claimed in claim 8, wherein said each template more specifically corresponds only to the moving object.

10. A method for recognizing movement of a moving object by photographing the moving object by an image pick-up means and processing images obtained by the image pick-up means, comprising the steps of:

cutting out and dividing an image including only one moving object as templates from an input image obtained by the image pick-up means, each template corresponding substantially to the moving object; and matching patterns between a cut-out template corresponding substantially to the moving object and a subsequent input shade image at a next time point, and determining a position of the moving object within the input image.

11. A method as claimed in claim 10, wherein said each template more specifically corresponds only to the moving object.

12. A system for following, in a picked-up image, a moving object of a shape and size changing with the direction of movement and distance from the image pick-up means, comprising:

a template memory circuit for storing, as a template, a pattern of an image of the moving object as a template, said template corresponding substantially to the moving object;

a pattern matching circuit for determining a position of the moving object by pattern matching between the template corresponding substantially to the moving object stored in the template memory circuit and an input image obtained from the image pick-up means; and a template updating circuit for preparing an updated template corresponding substantially to the moving object for a next pattern matching from the template of the moving object cut out of a present input image and a preceding template of the moving object and storing the updated template in the template memory circuit.

13. A system as claimed in claim 12, wherein said template and said updated template more specifically correspond only to the moving vehicle.

14. A vehicle recognition system for photographing a road by a TV camera and recognizing vehicle movement by processing images from the TV camera, comprising:

a background template extracting circuit for extracting, as a background template from an input image obtained by the TV camera, an image pattern corresponding substantially to a background;

a template extracting circuit for extracting, as a vehicle template from an input image obtained by the TV camera, an image pattern corresponding substantially to a vehicle, the vehicle template being different from the background template;

a template memory circuit for storing the background template and the vehicle template obtained with the background template extracting circuit and the template extracting circuit;

a pattern matching circuit for determining a vehicle position within a subsequent input image by pattern matching between the background template, the vehicle template and the subsequent input image.

15. A vehicle recognition system for photographing a road by a TV camera and recognizing vehicle movement by processing images from the TV camera, comprising:

a background template extracting circuit for extracting, as a background template from an input image obtained by the TV camera, an image pattern corresponding substantially to a background;

a template extracting circuit for extracting, as a vehicle template from an input image obtained by the TV camera, an image pattern corresponding substantially to a vehicle;

a template memory circuit for storing the background template and the vehicle template obtained with the background template extracting circuit and the template extracting circuit;

a moving area extracting circuit for extracting, as a moving area from a plurality of subsequent input images obtained by the TV camera, an image pattern corresponding substantially to a changing portion of the input images;

a subtracting arrangement for subtracting the background template and the moving area from an input image; and a pattern matching circuit for determining a vehicle position within a resultant image from the subtracting arrangement by pattern matching between the template stored in the template memory circuit and the resultant image, so as to determine whether or not a stalled vehicle is present.

* * * * *